(12) United States Patent
Karkos, Jr. et al.

(10) Patent No.: US 8,282,268 B2
(45) Date of Patent: Oct. 9, 2012

(54) MAGNETIC DRIVE FOR FOOD PROCESSING APPARATUS

(75) Inventors: John F. Karkos, Jr., Lisbon Falls, ME (US); Ron Flanary, Blacksburg, VA (US)

(73) Assignee: Island Oasis Frozen Cocktail Co., Inc., Winchester, MA (US)

( * ) Notice: Subject to any disclaimer, the term of this patent is extended or adjusted under 35 U.S.C. 154(b) by 540 days.

(21) Appl. No.: 12/391,864

(22) Filed: Feb. 24, 2009

(65) Prior Publication Data

US 2010/0214867 A1    Aug. 26, 2010

(51) Int. Cl.
   *B01F 13/08* (2006.01)
(52) U.S. Cl. .................................. 366/273; 366/314
(58) Field of Classification Search .............. 366/273, 366/274, 314
   See application file for complete search history.

(56) References Cited

U.S. PATENT DOCUMENTS

| | | | |
|---|---|---|---|
| 1,242,493 A * | 10/1917 | Stringham | 366/274 |
| 1,420,773 A * | 6/1922 | Stainbrook | 366/274 |
| 4,528,824 A | 7/1985 | Herbert | |
| 4,681,030 A | 7/1987 | Herbert | |
| 5,332,374 A | 7/1994 | Kricker et al. | |
| 6,095,677 A | 8/2000 | Karkos, Jr. et al. | |
| 6,164,575 A | 12/2000 | Karkos, Jr. | |
| 6,220,047 B1 | 4/2001 | Vogel et al. | |
| 6,325,312 B1 | 12/2001 | Karkos, Jr. | |
| 6,336,603 B1 | 1/2002 | Karkos, Jr. et al. | |
| 6,619,304 B2 | 9/2003 | Worm | |
| 6,712,497 B2 | 3/2004 | Jersey et al. | |
| 6,719,175 B2 | 4/2004 | Mackenzie et al. | |
| 6,793,167 B2 | 9/2004 | Karkos, Jr. et al. | |
| 6,899,454 B2 | 5/2005 | Terentiev | |
| 6,911,756 B1 | 6/2005 | Chang | |
| 6,941,724 B2 | 9/2005 | Arrant et al. | |
| 7,086,778 B2 | 8/2006 | Terentiev | |
| 7,267,479 B2 | 9/2007 | Terentiev | |
| 2002/0196705 A1 | 12/2002 | Jersey et al. | |
| 2003/0047202 A1 | 3/2003 | Worm | |
| 2003/0080644 A1 | 5/2003 | Nelson et al. | |
| 2006/0210412 A1 | 9/2006 | Lawyer et al. | |
| 2007/0030759 A1 | 2/2007 | Terentiev | |
| 2007/0221068 A1 | 9/2007 | Boussemart et al. | |

* cited by examiner

*Primary Examiner* — David Sorkin
(74) *Attorney, Agent, or Firm* — Lando & Anastasi, LLP

(57) ABSTRACT

Food processing apparati including magnetic drives are described herein. According to one exemplary embodiment, a food processing apparatus may include a motor having a motor shaft, a rotor rotatably mounted on the motor shaft, and a stator producing an electromagnetic field for interacting with the rotor. The rotor may magnetically drive a drive plate coupled to an impeller inside a food-contact chamber.

20 Claims, 22 Drawing Sheets

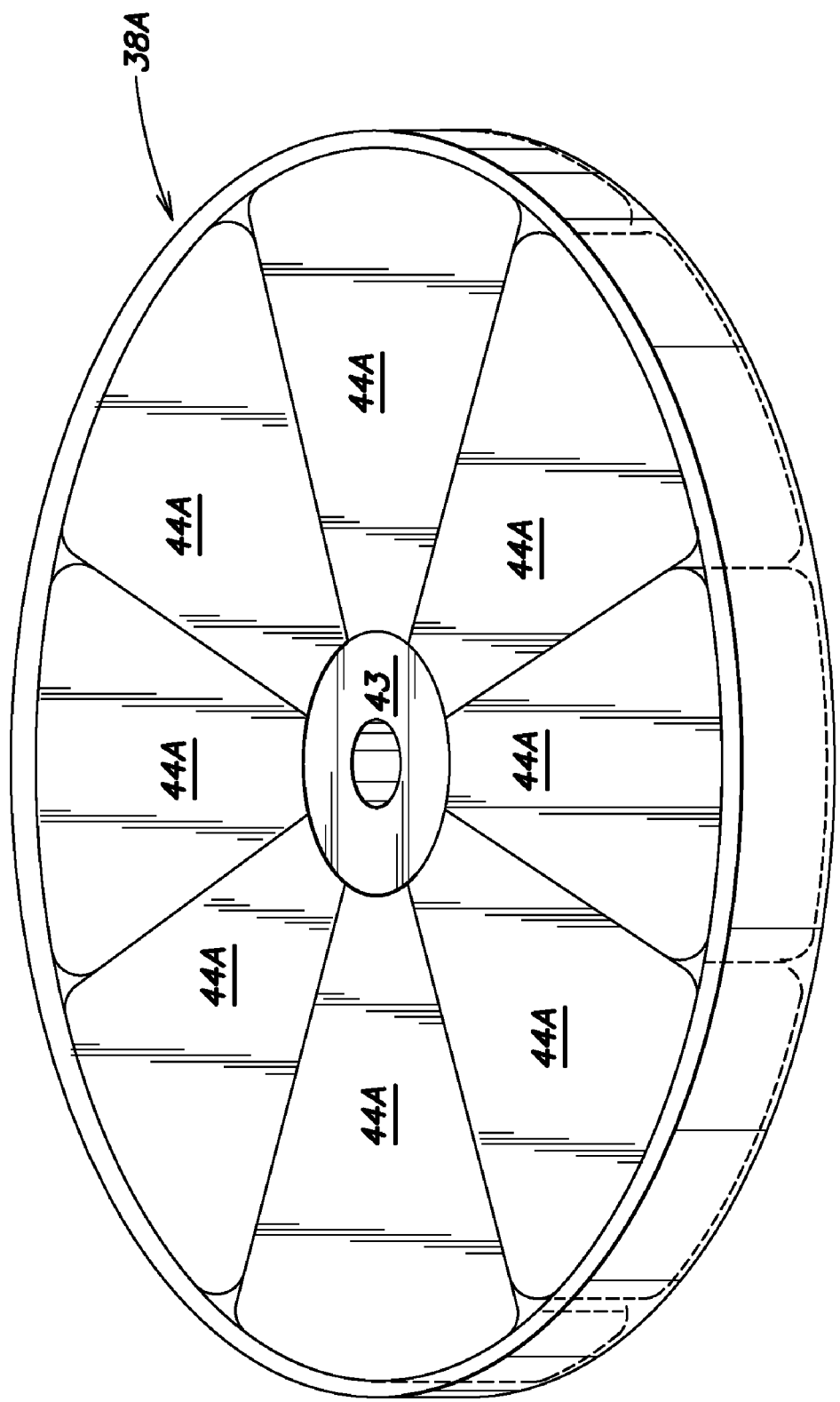

MAGNETIC DRIVE FOR FOOD PROCESSING APPARATUS

BACKGROUND OF INVENTION

1. Field of Invention

Embodiments described relate to magnetic drives for food processing equipment, particularly for food processing equipment including a food contact chamber separable from a motor drive unit, such as blenders, mixers and the like.

2. Discussion of Related Art

Conventional home blenders and mixers typically incorporate a mechanically-driven impeller rotatably mounted within a removable blender cup. The base of the cup incorporates a generally circular connection plate with a pattern of projections and/or depressions formed on its lower face that is removably mateable, using a vertical, drop-in movement, with a corresponding pattern formed on a like plate attached to the shaft of a motor housed in a base of the machine. This mechanical coupling between the blender cup and the blender motor often requires a rotary seal at the base of the cup between the impeller and connecting plate. This seal is subject to considerable wear and tear over time, as is the mechanical coupling. Because seal failure can result in liquid leaking out of the cup, the seal and bearings in the base of the cup are typically built to ensure sealing at the expense of friction. The friction produces wear, heat, and loss of power. Moreover, the conventional blender produces much unwanted noise, and the mechanical interlocking coupling between the plates can make it awkward or difficult to remove the cup from, and return the cup to, the base.

Many drink mixers have the drive motor mounted in the base directly under the cup. If overall height is a concern, however, the motor may be positioned off to the side and coupled to the driving shaft by a belt or gear arrangement.

A commercially viable blender/shaver for the production of frozen drinks should preferably satisfy a variety of special and important design criteria. It should be compact, both in its footprint and overall height, so as to utilize limited space at a bar efficiently. It ideally has a comparatively low weight. The straight-forward approach of placing a conventional electric motor directly under the blender cup increases the overall height of the machine, and therefore considered undesirable in connection with mechanical linkages.

There should also be speed control, typically provided through gearing and electronics, to accommodate different power and speed requirements in different phases of operation. Rapid controlled braking is also desirable to limit the overall time required to blend, to avoid splashing of the blended material after blending is complete, and for safety. Control of vibration, prevention of overheating, or minimization of wear, ease of maintenance, and durability are also important.

It has also been known that an impeller within a blender cup may be driven magnetically or electromagnetically rather than mechanically. One type of magnetic drive couples a rotating permanent magnet outside a blender cup or the like, to another permanent magnet rotatably mounted in the blender cup. U.S. Pat. No. 2,459,224 to Hendricks; U.S. Pat. No. 2,655,011 to Ihle et al.; and U.S. Pat. No. 5,478,149 to Quigg are exemplary of this approach. Hendricks discloses a magnetically operated stirrer for mixing liquids, in which the stirrer has a magnet mounted at its lower end and within the container for the liquid. Quigg discloses a motor that drives a set of magnets, via gear box and shaft, to couple to another set of magnets mounted on an agitator.

U.S. Pat. No. 3,140,079 to Baermann uses a large rotating plate to carry a series of circumferentially spaced magnets that pass under one portion of a much smaller, rotatable conductive disc.

U.S. Pat. No. 1,242,493 to Stringham and U.S. Pat. No. 1,420,773 to Stainbrook disclose electrical drink mixers in which a stator of an AC motor surrounds and interacts with a rotor in a blender cup, or in its base. In Stringham, a squirrel cage rotor lies in the plane of the stator windings. In Stainbrook, an alternating current (AC) rotor is mounted in the base of the blender cup and stator coils are located below the cup. Such split AC motor arrangements are limited by the torque, speed control, eddy current loss, and emf interference problems of a.c motors, as accentuated by the physical separation of the stator windings and the rotor. They often do not provide good speed control. They do not utilize a direct current (DC) magnetic field coupling. Further, the inclusion of the rotor of the motor within the container or cup often adds unwanted weight to the cup assembly and makes the cup difficult to handle due to gyroscopic effects if it is picked up while the rotor is still spinning.

If the permanent magnet rotor of a brushless DC motor were to be located in the base of a blender cup, the cup would not only become heavy and exhibit a severe gyroscopic effect, but it would also "stick" to steel or iron sinks and countertops, and would attract loose steel or iron objects such as some flatware, barware, or coins.

One or more of the present inventors have described magnetic drive food processing equipment in U.S. Pat. Nos. 6,095,677, 6,336,603, 6,210,033, and 6,793,167.

SUMMARY OF INVENTION

According to one embodiment, a magnetic drive for food processing equipment including a food-contact chamber includes a driving member disposed outside the food-contact chamber, the driving member including a plurality of permanent magnet poles carried on a rotating shaft; and a driven member disposed within the food-contact chamber, the driven member including discrete bodies of magnetically soft material supported from a rotating shaft in opposed relationship to the plurality of permanent magnet poles.

According to another embodiment, a food processing apparatus having a rotary element to be driven by a rotating magnetic field includes a food-contact chamber defined by an exterior wall. A driven member is disposed within the food-contact chamber. The driven member including discrete bodies of magnetically soft material supported from a rotating shaft arranged to rotate responsive to the rotating magnetic field.

BRIEF DESCRIPTION OF DRAWINGS

The accompanying drawings are not drawn to scale. In the drawings, each identical or nearly identical component that is illustrated in various figures is represented by a like numeral. For purposes of clarity, not every component may be labeled in every drawing. In the drawings:

FIG. 5A is a perspective view of an embodiment of the magnet assembly shown in FIG. 4;

DETAILED DESCRIPTION

Figure 1:
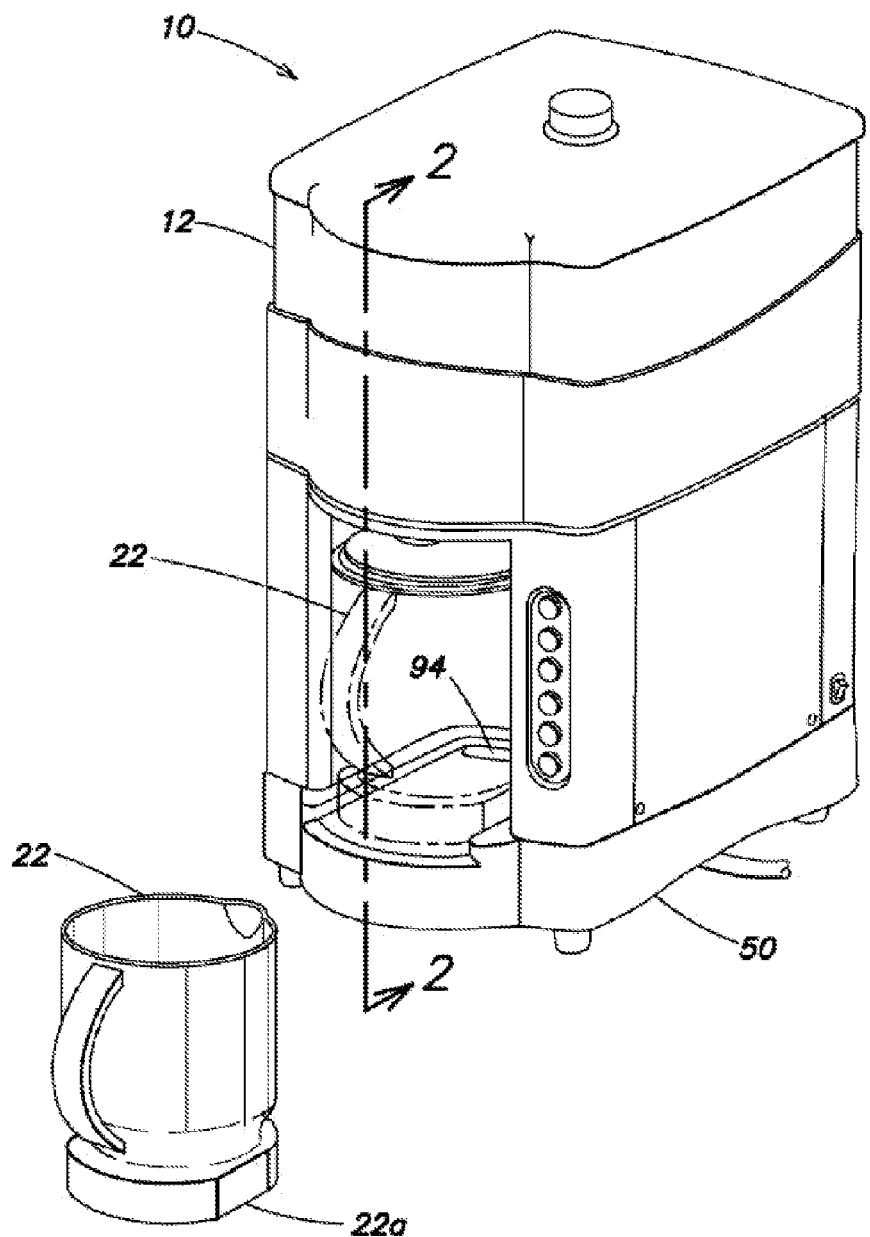
FIG. 1 is a perspective view of a blender/shaver machine constructed according to an embodiment of the present invention.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Figure 2:
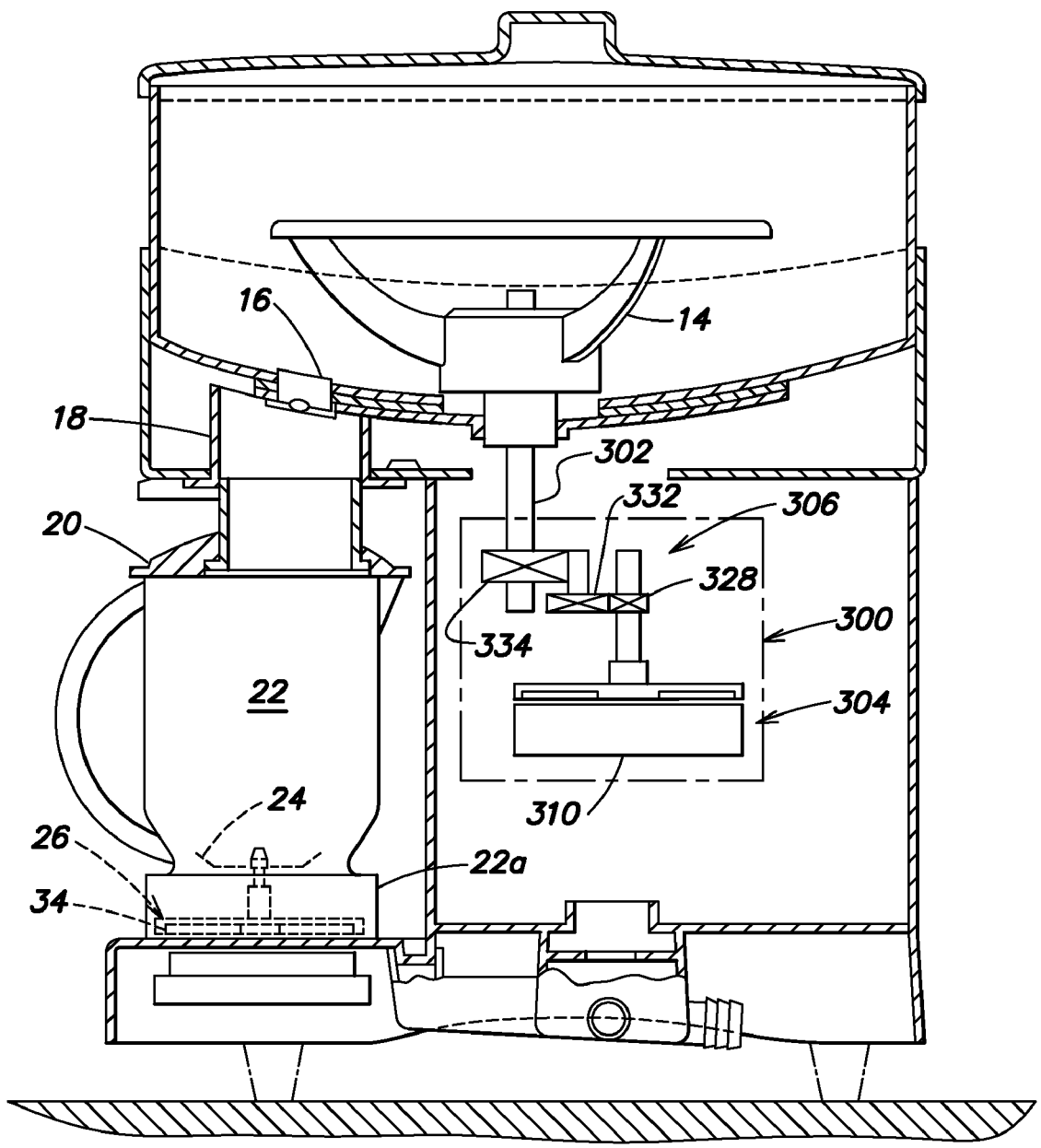
FIG. 2 is a vertical sectional view of along line 2-2 of the blender/shaver machine of FIG. 1.

FIGS. 1 and 2 show a principal application of embodiments of aspects of the present invention, namely, in a blender/shaver machine 10 adapted to the automatic manufacture of frozen drinks in bars and restaurants. A supply of ice in a hopper 12 is fed by a rotating set of blades 14 to a blade 16. The shaved ice falls through a chute 18 including a lid 20 into a blender cup 22 to which liquid ingredients such as a flavor concentrate and/or spirit have been added. Rotation of an impeller (or blade set) 24 at the bottom of the cup for a preset period of time produces a high quality frozen drink—one that peaks when poured and has a generally uniform, non-marbled, non-watery consistency. While some embodiments will be described below principally with reference to use in the blender/shaver 10, it will be understood that various embodiments are possible to suit a wide variety of applications where it is desired to transmit power from motive source (for example, a rotary output of a motor, or a rotating magnetic field generated by a plurality of electromagnets) to a driven member under a load, particularly a rotating driven member held in a container that is sealed from and removable from the motive source. Embodiments can be used, for example, in a variety of food processing equipment such as home blenders, food mixers, food processors and juicers.

Figure 13:
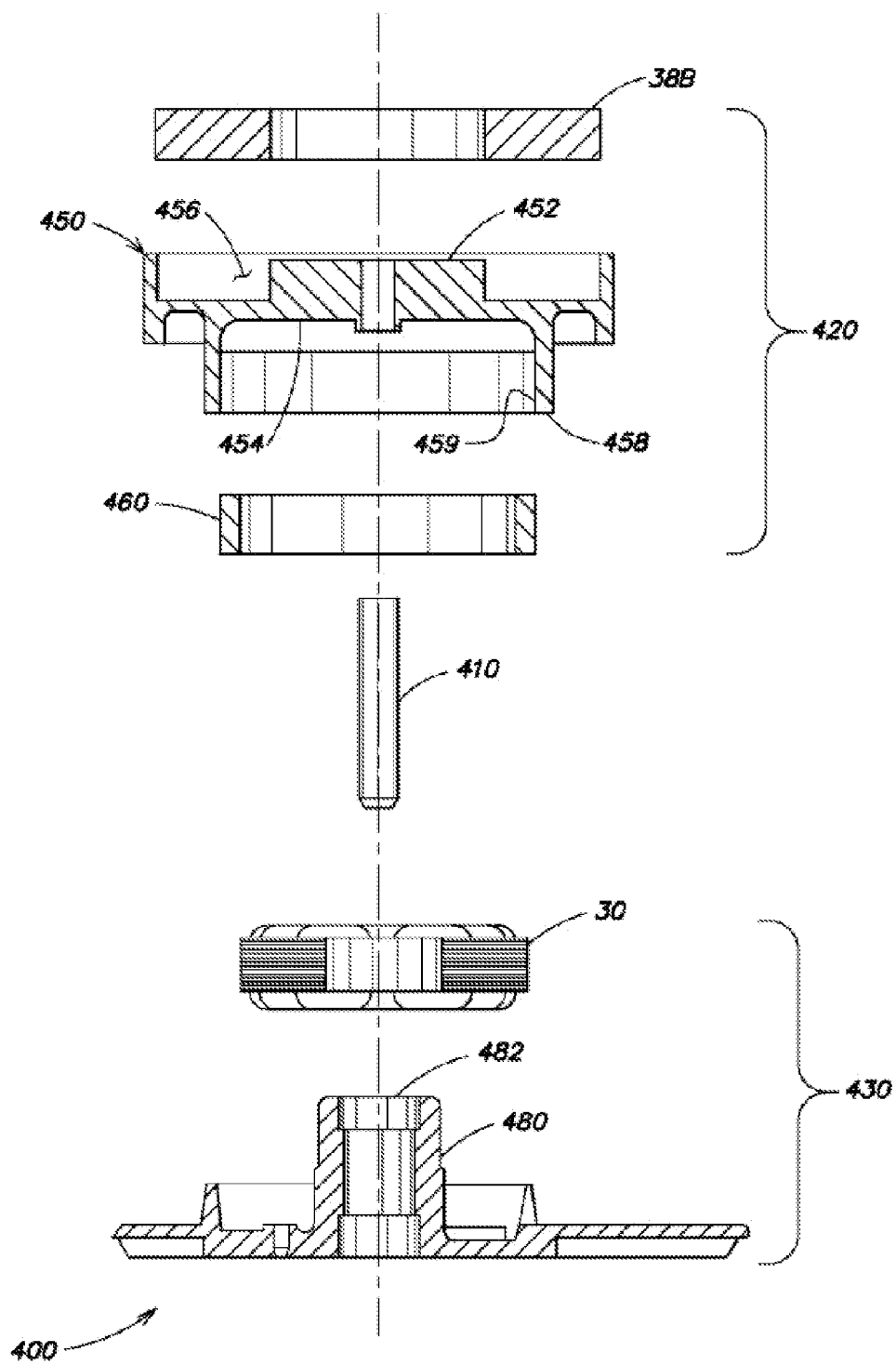
FIG. 13 is an exploded vertical sectional view of an alternative embodiment of the motor of the present invention.
Figure 14:
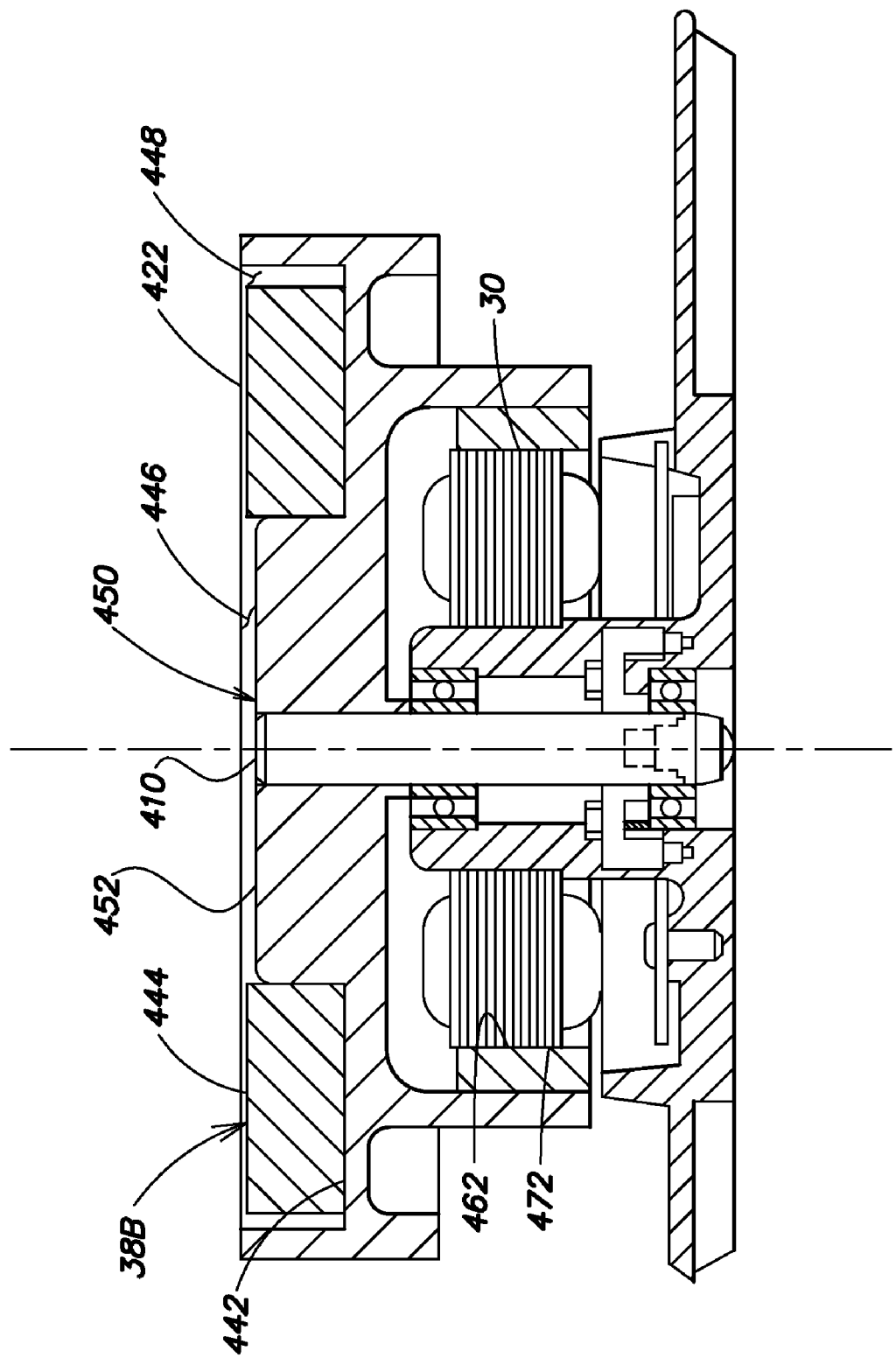
FIG. 14 is a vertical sectional view of the embodiment of the motor shown in FIG. 13, illustrating an assembled motor.
Figure 15:
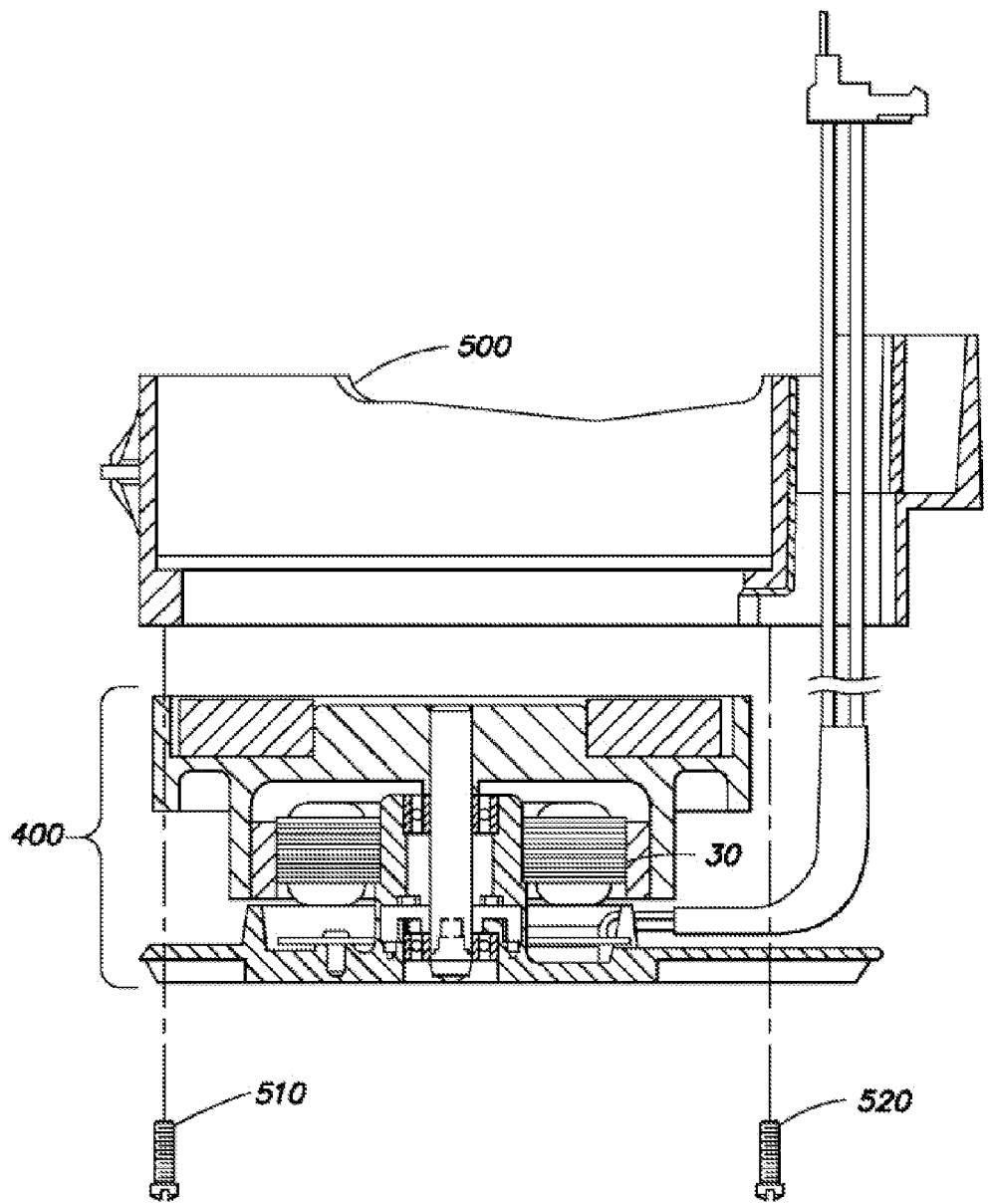
FIG. 15 is an exploded vertical sectional view of the motor shown in FIG. 13, illustrating a motor base.

An embodiment of a magnetic drive 26 for the impeller 24 is now described. With reference to FIGS. 3-5D, the drive 26 includes a generally circular drive plate 34 rotatably mounted in the base 22a of the blender cup 22 and a motor 28 including a stator 30 (one aspect of which is illustrated in FIGS. 13-15) and a rotor 32. The rotor in turn preferably includes or carries a drive magnet assembly, embodiments of which are shown as drive magnet assemblies 38A and 38B in FIGS. 5A and 5B, respectively. The motor 28 may be any suitable AC or DC type. The drive magnet assembly 38A, 38B, described in greater detail below, may be separate from or integrated with the working elements of motor 28.

An embodiment of the drive magnet assembly 38A has multiple circumferentially-arrayed, axially-directed poles, eight as shown in FIG. 5A. Laterally adjacent segments have the opposite polarity. While this illustrative embodiment has eight poles, any even number may be used. Each pole may be developed by a generally pie-shaped permanent magnet region 44A formed in a continuous ring of a strongly magnetic material such as the ceramic magnets sold by Hitachi Corporation. The magnet regions 44A in drive magnet assembly 38A can also be separate pieces bonded or otherwise mechanically secured proximate or to one another to form a ring assembly with flat faces and a generally cylindrical outer wall. A hub 43 with optional radially directed support walls (not shown) fills the center of the drive magnet assembly 38A to facilitate mounting the assembly on a central shaft 70 (shown in FIG. 4). Hub 43 may be constructed of plastic, metal, ceramic, or combinations thereof. A north pole magnet region 44A is adjacent a south pole magnet region 44A. This magnet assembly configuration with axially oriented magnetic pole regions 44A directs the magnetic field (lines of flux) of the drive magnet assembly 38A axially upwardly (in the direction indicated as Ax in FIG. 4) toward the plate 34 in the cup base 22a. The strength and this axial directing of the field of the drive magnet assembly 38A induce magnetic fields of opposite polarity in a corresponding pole elements 34a formed in the drive plate 34 despite the presence of a spacing 46, albeit a close spacing, between the generally flat upper surface 38*u* of the magnet assembly and the generally flat lower surface 34*c* of the plate 34.

Figure 4:
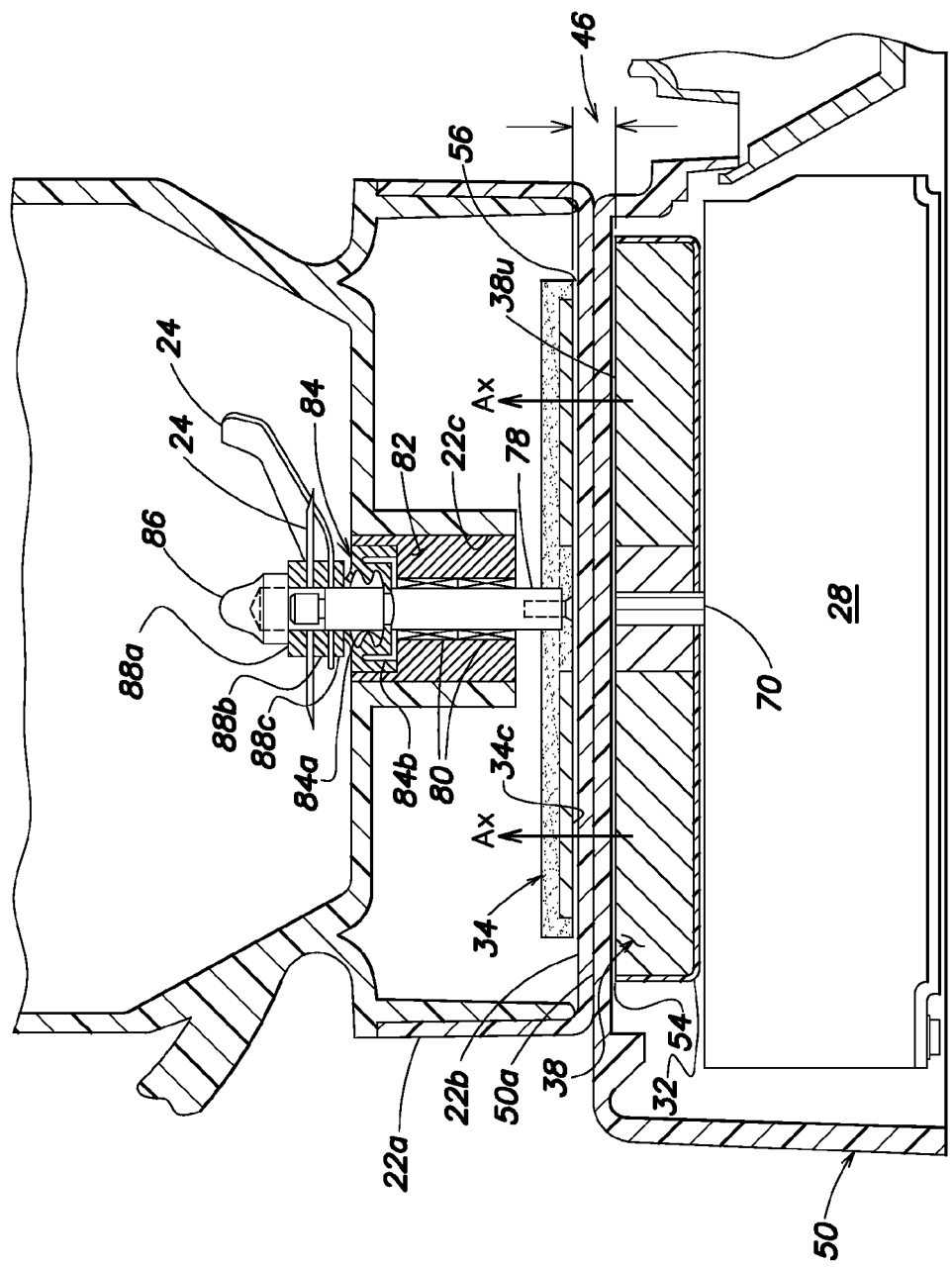
FIG. 4 is a detailed vertical sectional view of the magnetic drive of an embodiment of the present invention as shown in FIG. 2 used to power an impeller mounted in the base of a blender cup.

In the embodiment illustrated in FIG. 5A, for example, and shown for the blender/shaver (used to blend up to 80 fluid ounces of a frozen drink), the permanent magnet assembly 38A develops a magnet field strength of about 1400 gauss at its surface, and the spacing 46 is about 0.25 inch measured axially. This spacing includes, as shown in FIG. 4, not only layers 50*a* and 22*b* of what is typically a plastic material, but also air gaps 54 and 56. A thin over-molding for the drive magnet assembly 38A, formed of plastic, epoxy, combinations thereof, or other suitable materials, may also be present in some embodiments. The layer 50*a* is the flat upper wall portion of a base 50 of the blender/shaver 10. Layer 22*b* is the flat lower wall of the cup base 22*a*.

The air gap 54 is a slight clearance between the rotor, or the rotor over-molding, if present, and the wall 50*a*. The gap 56 is a slight clearance between the wall 22*b* and the drive plate 34, or any drive plate covering or over-molding, if present. As will be readily appreciated by those skilled in the art, this spacing is a significant source of reluctance in the magnet circuit between the drive magnet assembly 38A and the drive plate 34. Permanent magnet rotors of known DC brushless motors, e.g., the 5 inch disc-diameter motor sold by Integrated Motion Controls, LLC of Torrington, Conn., under its Model No. 50, while roughly comparable in size, construction and field strength to the drive magnet assembly 38A, cannot couple to the drive plate 34 across the spacing 46 with sufficient strength to drive the drive plate operating a blender/shaver.

Figure 5B:
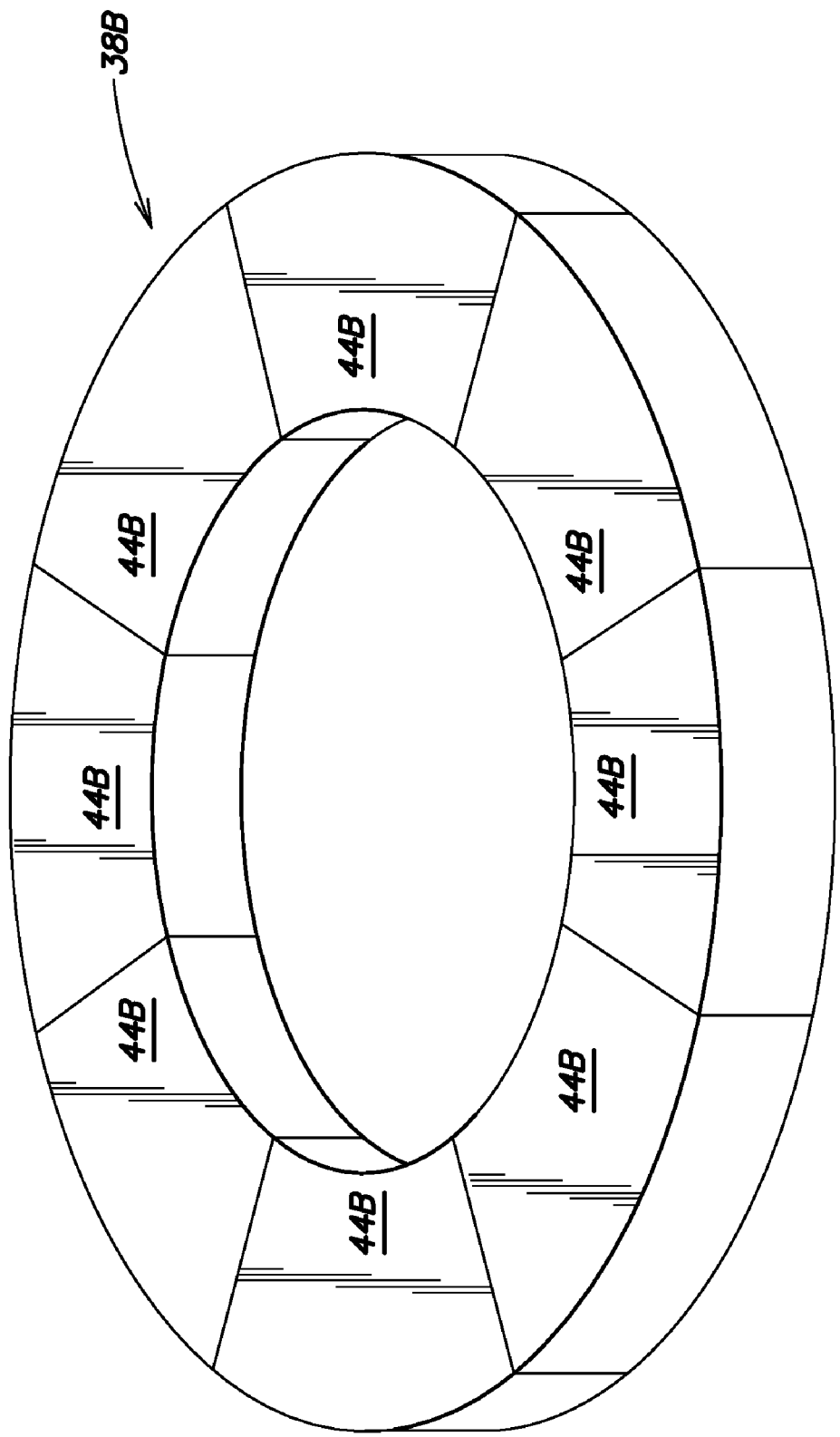
FIG. 5B is a perspective view of an alternate embodiment of the magnet assembly shown in FIG. 5A.

An alternate embodiment of drive magnet assembly 38A is illustrated in FIG. 5B, and in cross section in FIGS. 13 and 14 as ring magnet 38B. Ring magnet assembly 38B has multiple circumferentially-arrayed, axially-directed poles, eight as shown in FIG. 5B. Laterally adjacent segments have the opposite polarity. While this illustrative embodiment has eight poles, any even number can be used. Each pole may be developed by a permanent magnet region 44B formed in a continuous ring of a strongly magnetic material such as the ceramic magnets sold by Hitachi Corporation. The magnet regions 44B in ring magnet assembly 38B can also be separate pieces bonded or otherwise mechanically secured proximate or directly to one another to form a ring assembly with flat upper and/or lower faces and generally cylindrical inner and/or outer walls. Ring magnet 38B may be shaped and sized to fit into a recess 456 of hub 450 as illustrated in FIGS. 13 and 14. A north pole magnet region 44B is adjacent a south pole magnet region 44B. This magnet assembly configuration with axially oriented magnetic pole regions 44B directs the magnetic field (lines of flux) of the ring magnet assembly 38B axially upwardly toward the plate 34 in the cup base 22*a*. The strength and this axial directing of the field of the ring magnet assembly 38B induce magnetic fields of opposite polarity in a corresponding pole elements 34*a* formed in the drive plate 34 despite the presence of a spacing 46, albeit a close spacing, between the generally flat upper surface 38*u* of the magnet assembly and the generally flat lower surface 34*b* of the drive plate 34.

Figure 5C:
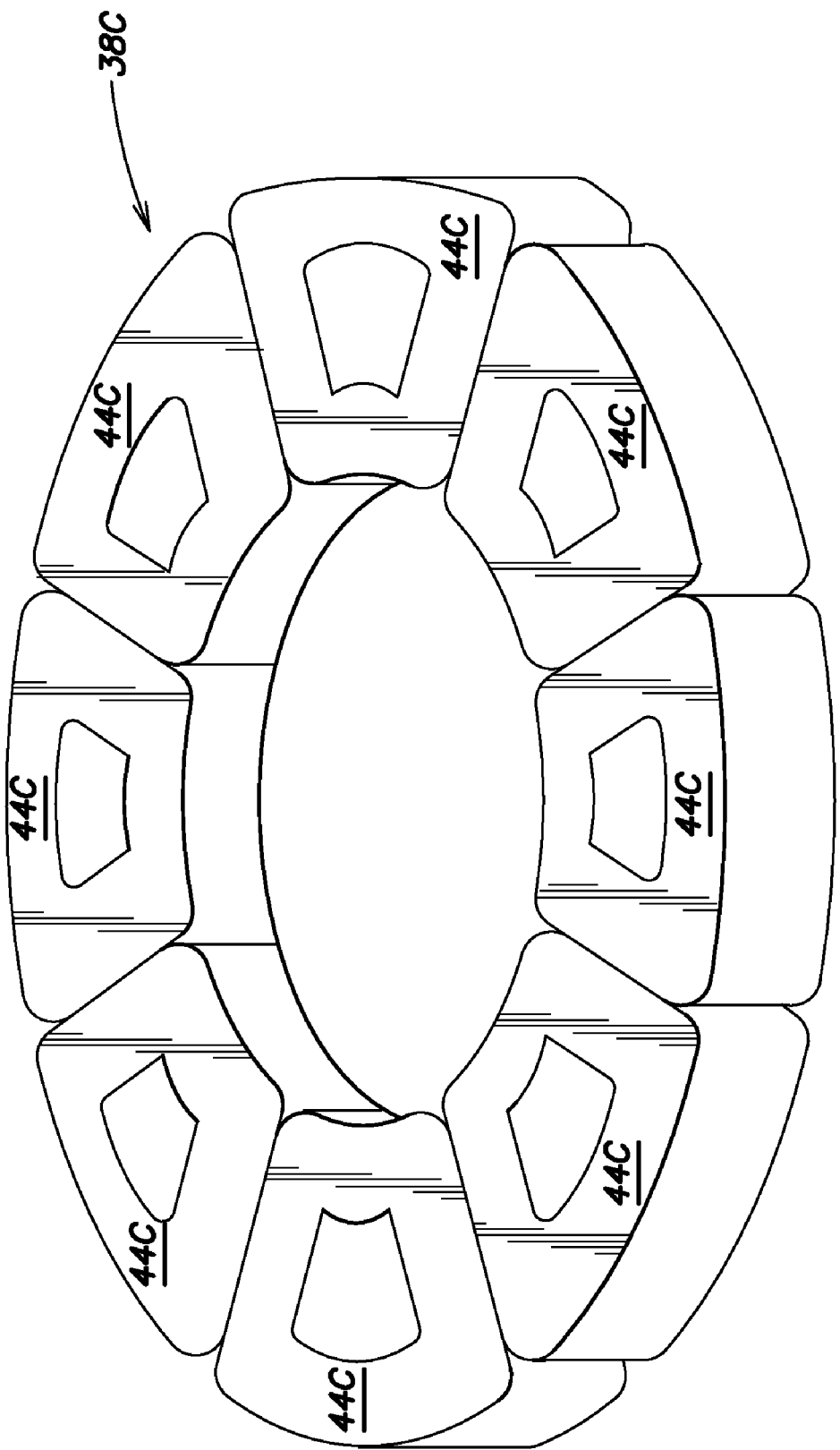
FIG. 5C is a perspective view of an electromagnet assembly that may be used in place of the magnet assembly of FIG. 5A in one or more embodiments.

As an alternative to permanent magnet assemblies, such as assemblies 38A and 38B, motive force can be applied to drive plate 34 utilizing a rotating magnetic field generated by a plurality of electromagnets, as illustrated in FIG. 5C as electromagnet assembly 38C. Electromagnet assembly 38C may include a plurality of electromagnets 44C, for example, eight as shown in FIG. 5C. While this illustrative embodiment has eight electromagnets, any number can be used. In operation, this electromagnet assembly configuration directs the magnetic field (lines of flux) of the electromagnet assembly 38C axially upwardly toward the plate 34 in the cup base 22*a*. Electromagnet assembly 38C may be fixedly mounted on a circuit board (not shown) or other surface in base 50 of blender/shaver 10, and in some embodiments may be substantially aligned with drive plate 34 in cup base 22*a* when cup 22 is place in position in blender/shaver 10. A circuit board or other form of drive electronics may supply current to electromagnets 44C in a manner as would be known to one of skill in the art to induce a rotating axial magnetic field capable of inducing a motive force in drive plate 34. The rotating magnetic field should have a sufficient magnitude to provide the desired torque. The skilled artisan will be able to select the number of poles, size and number of wire turns and current supplied to meet various design goals.

The utilization of a fixed ring of electromagnets 44C may provide advantages in terms of reliability and/or reduction of maintenance requirements by providing a means of inducing a rotating magnetic field capable of driving drive plate 34 without the need for moving parts in base 50. In some designs, this may be at a cost of lower torque capabilities.

Figure 5D:
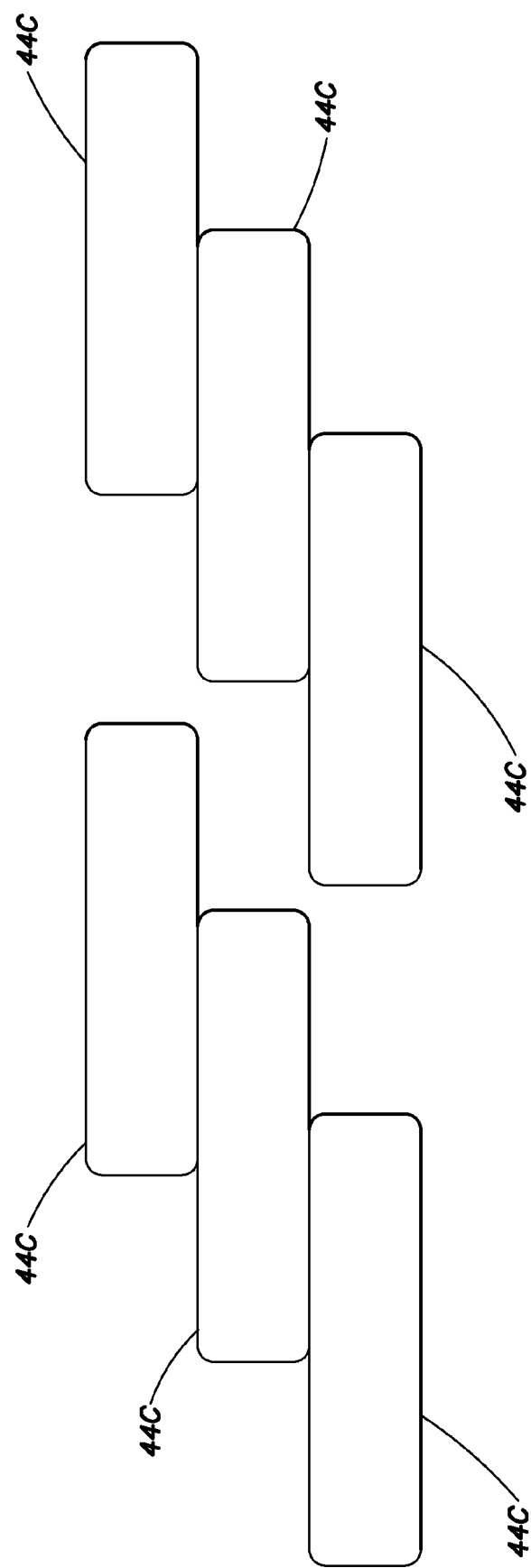
FIG. 5D is a partial vertical sectional view of the electromagnet assembly of FIG. 5C.

In one or more further embodiments, electromagnets 44C may be positioned in more than one vertical level, and in some embodiments, be positioned so as to partially overlap one another, as is illustrated in FIG. 5D, which is a partial cross sectional view of an electromagnet assembly similar to that of FIG. 5C, but with three layers of electromagnets instead of one. In some embodiments, greater or fewer than three vertical layers of electromagnets may be used. In some embodiments (not shown), electromagnets proximate to one another may also be displaced horizontally and/or axially rather than forming a single ring of electromagnets. These embodiments may in some cases allow for a more smoothly rotating magnetic field than the embodiment of FIG. 5C.

Figure 6:
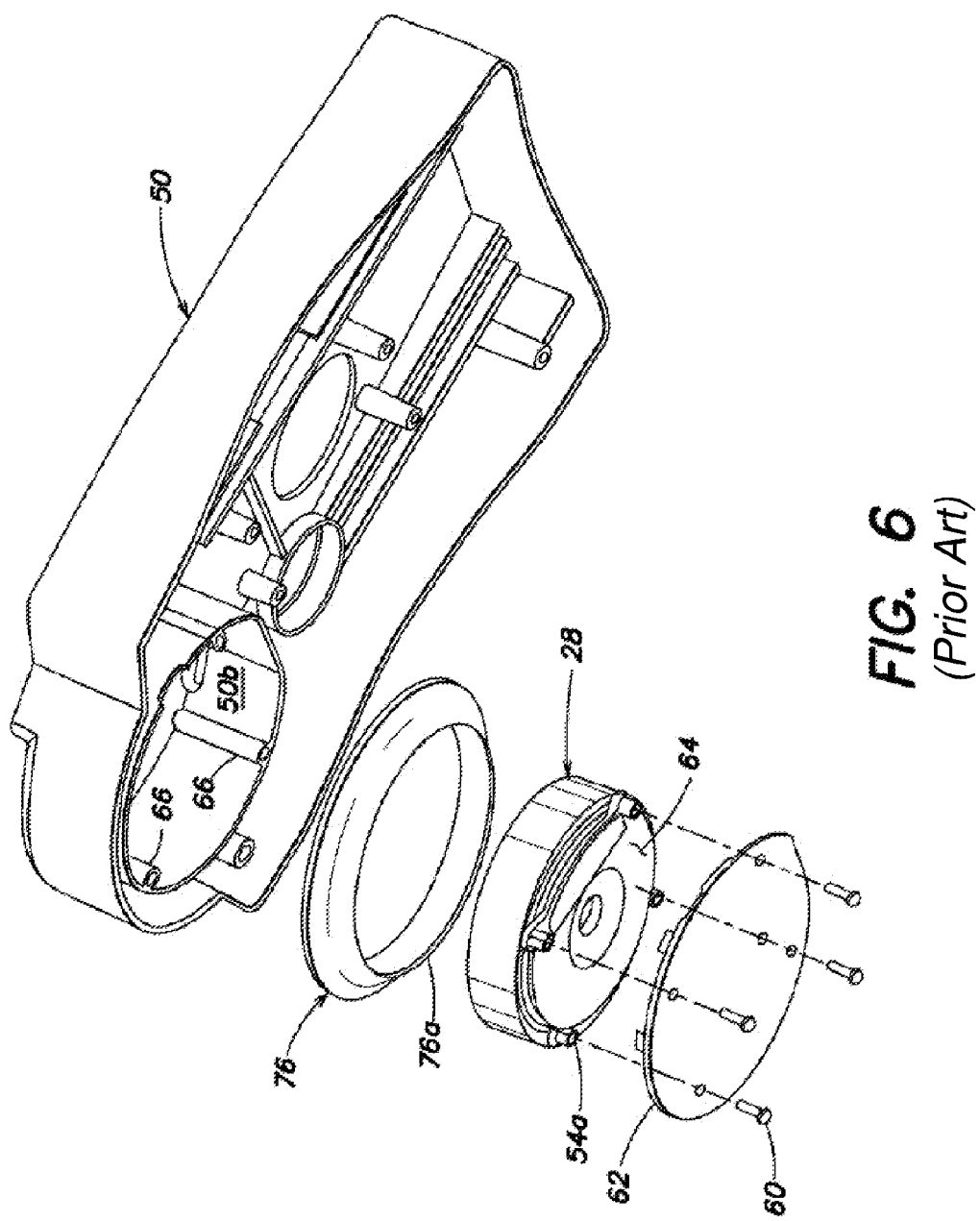
FIG. 6 is an exploded perspective view of the base of the blender/shaver shown in FIGS. 1 and 2 showing the mounting of the motor assembly for the magnetic drive according an embodiment of the present invention.

With reference to FIG. 6, the motor 28 may be mounted in the base 50 by screws 60 that pass through a steel motor cover 62 and a rear stator support 64 into threaded sockets 66 formed in a motor mount wall 50*b* of the base. The rear stator support 64 has a central opening that holds a bearing assembly (not shown) that journals a motor shaft. The base is preferably formed of a moldable, high-strength plastic, and with a wall thickness that rigidly supports the motor 28.

The motor shaft (illustrated in FIGS. 13 and 14 as shaft 410) is secured axially at the center of magnet assembly 38 and slides axially into a bearing assembly (not shown) in motor 28. The magnet assembly 38 rotates in the bearing assembly with a clearance on all sides of the magnet assembly 38. As a safety precaution against combustion should the motor 28 overheat, a ring-like shroud 76 has a lower flange 76*a* that extends substantially across the air gap between the outer edge of the magnet assembly 38 and the generally cylindrical inner side wall of the rear stator support 64 (with a slight clearance to avoid frictional contact with the magnet assembly 38). The shroud fills this gap sufficiently to impede an air flow that would otherwise feed oxygen to a fire.

A five-inch diameter magnet assembly 38 may weigh approximately three pounds. With typical operating speeds varying from about 4,000 rpm to about 10,000 rpm, significant forces may be exerted on the mounting structures, particularly rapidly varying forces that may produce vibrations. The mounting structure is preferably made sufficiently rigid, through choice and dimensions of materials as well as the overall design, e.g., the use of wall reinforcements such as exterior ribs, to resist the forces and moments produced in normal operation, and thereby to control vibrations that would otherwise loosen, wear, and in the extreme, eventually destroy the motor.

Position of the rotor may be sensed by three conventional Hall effect sensors mounted in a known manner in the motor housing, or the base 50. Position signals provide input to an electronic control and drive circuit such as are known in the art that energizes then motor 28 to produce (i) a start-up torque, (ii) a ramp up of the rotor speed of rotation to a selected operating speed, (iii) a maintained rotation at that selected speed under load, and then (iv) a rapid and reliable braking. Operation of the motor is thus electronically controlled and programmable. Braking is electronic—in some aspects the braking currents induced in windings of the motor 28 (in aspects where motor 28 has windings) is dissipated in large resistors or FETs mounted on heat sinks.

Figure 3:
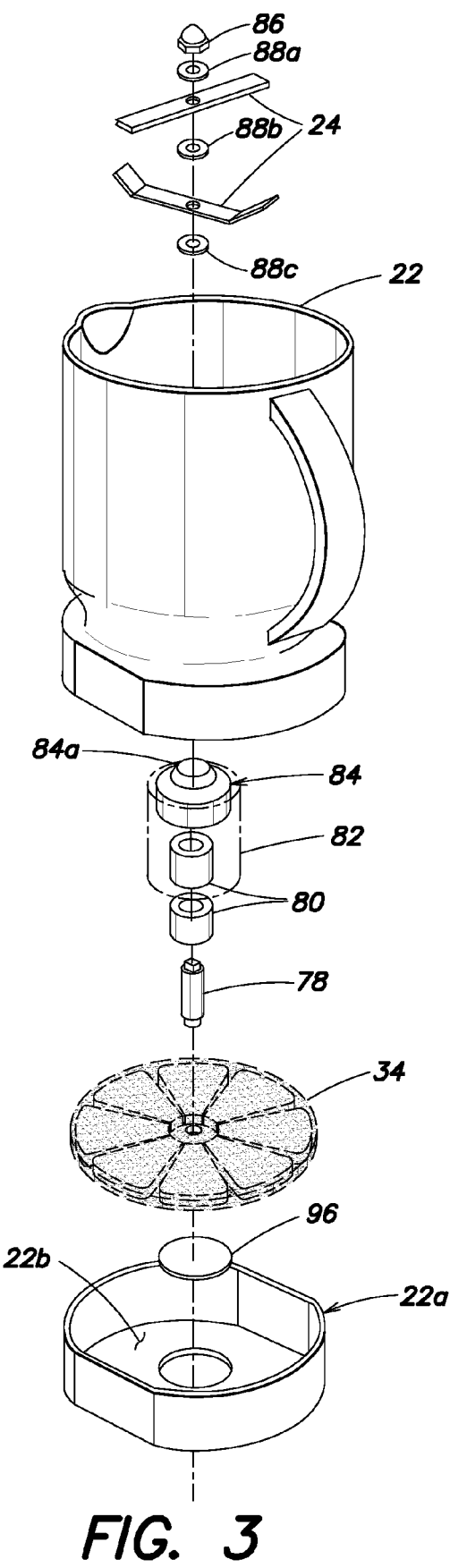
FIG. 3 is an exploded perspective view of the blender cup shown in FIGS. 1 and 2.

With reference to FIGS. 2-4, and especially FIGS. 3 and 4, the drive plate 34 is non-rotatably secured to the lower end of a shaft 78 that is journalled in a stacked pair of needle bearing assemblies 80. A surrounding brass collar 82, press fit into a central, cylindrical-walled opening 22c in the plastic base 22a, holds the bearing assemblies 80. At the bottom of the cup, the collar 82 has an enlarged diameter counter bore that receives and secures a rotary seal 84 formed of a suitably elastomeric material such as a wear-resistant rubber. The seal has three inwardly facing, mutually-spaced lips 84a whose inner edges each engage, and provide a low-friction running or sliding seal around the shaft 78. The seal 84 retains liquid in the cup 22 despite the presence of a rotating shaft penetrating the bottom wall of the cup. The lower-most lip 84a engages the shaft 78 in a circumferential groove that locates and stabilizes the seal. A deep circular groove 84b in the lower face of the seal allows the lips to flex resiliently, yet lightly, against the shaft. Above the seal, an acorn nut 86 threaded on the upper end of the shaft 78 secures the blades 24 sandwiched between three washers 88a, 88b, and 88c.

Figure 7:
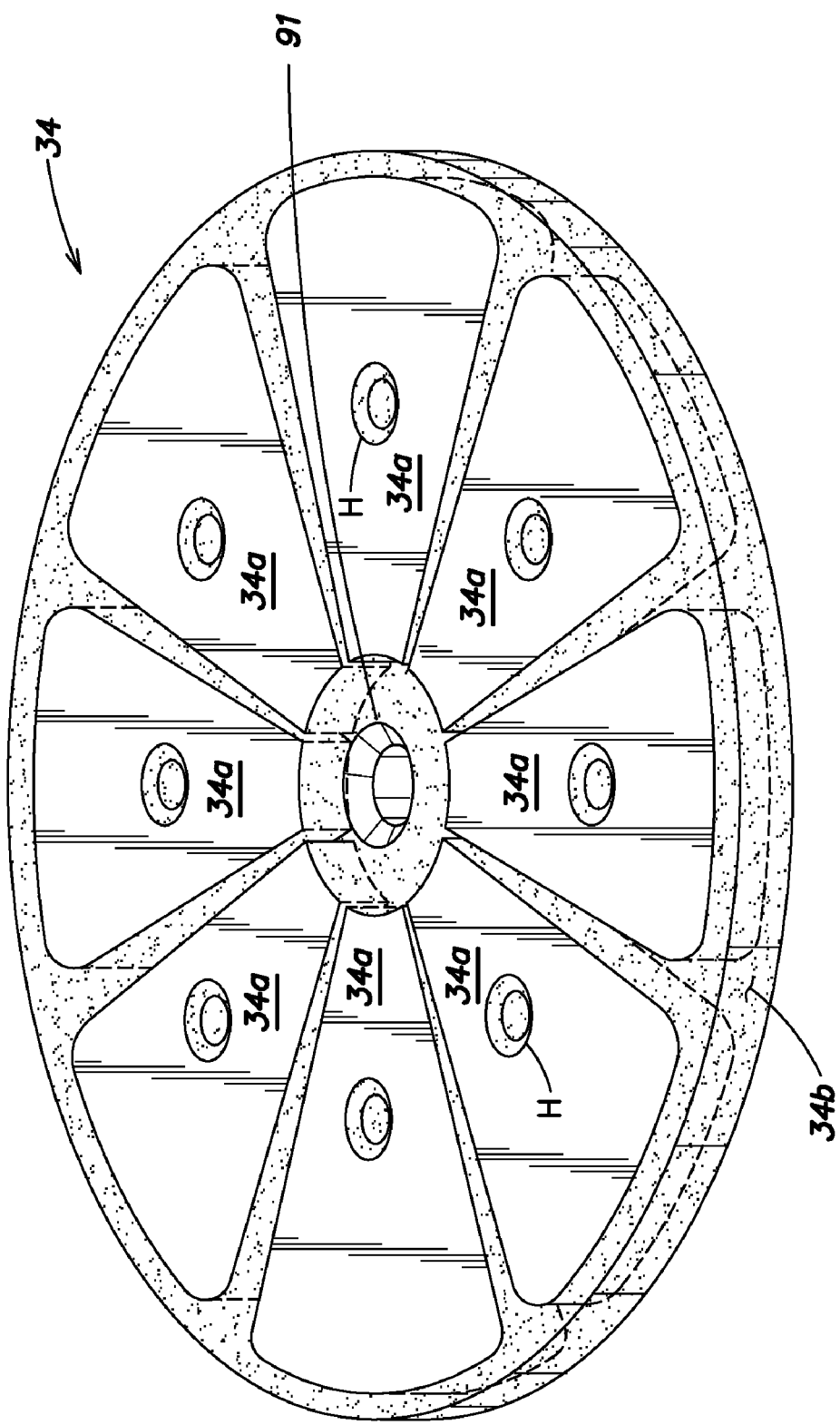
FIG. 7 is a perspective view of the drive plate assembly shown in FIG. 3.

The drive plate 34 may include a plurality of pole elements 34a (FIG. 7). Eight of such pole elements are illustrated in FIG. 7, but some aspects may include more or fewer of pole elements 34a. Pole elements 34a are in one or more embodiments formed of one or more sheets of a soft magnetic material such as cold-rolled steel, with a thickness of, for example, about 0.25 inches. The pole elements 34a are desirably of sufficient thickness to effectively couple to the magnetic field generated by the drive mechanism in base 50, but thin enough to keep drive plate 34 relatively light. Pole elements 34a may also be formed of alternate materials including ferromagnetic materials, or of a non-magnetic material in which are embedded pieces or particles of a soft magnetic material. In some aspects, pole elements 34a have a high resistivity and may be formed of materials such as ceramic ferrites. In some aspects pole elements 34a may be formed of laminated layers wherein layers of soft magnetic material are separated by layers of a non-magnetic material. Each of the layers of soft magnetic material and/or the non-magnetic material need not comprise the same material. Pole elements 34a may be embedded in a non-magnetic matrix 34b. Matrix 34b may be formed of materials such as epoxy or plastic. Pole elements 34a may be physically and/or electrically separated from one another by portions of matrix 34b. The separation of pole elements 34a from one another facilitates a reduction in eddy currents that may by induced in drive plate 34 by the rotating field of the drive magnet assembly 38. The formation of pole elements 34a from high resistivity materials or with thin and/or laminated structures may facilitate a reduction in eddy currents that may by induced in pole elements 34a themselves by the rotating field of the drive magnet assembly 32.

Drive plate 34 may be subject to deformation forces when it is subjected to the significant attractive magnetic force of the plate drive magnet assembly 38 (for example, about five pounds) and may be placed in frictional contact with the cup base 22a. Optional ribs (not shown) may be formed on an upper surface of drive plate 34 in order to impart additional mechanical strength. However, it has been discovered that with a prudent selection of material for matrix 34b, such as, for example, fiber reinforced epoxy, and a suitable shape for pole elements 34a, such as that illustrated in FIG. 7, drive plate 34 may be constructed with sufficient mechanical strength so that reinforcing ribs are not necessary. The elimination of reinforcing ribs improves the aerodynamics of drive plate 34. Additionally or alternatively, drive plate 34 may be encased in whole or in part by a covering or over-molding which may generally help the plate to retain its flat configuration and may also improve the aerodynamics of plate 34. The over-molding may be formed of, for example, epoxy, plastic, ceramic, other non-magnetic materials, or combinations thereof. The over-molding may, in one or more embodiments, be formed of the material of matrix 34b during a process of embedding pole elements 34a in matrix 34b or during a process of forming matrix 34b about pole elements 34a. In other embodiments, the over-molding may be applied to cover at least a portion of pole pieces 34a after the pole pieces 34a are secured in matrix 34b.

Matrix 34b may be formed of a continuous material or of multiple sections which may be mechanically coupled. Different portions of matrix 34b may be formed of different materials. Matrix 34b may in some aspects comprise a composite material including reinforcing elements such as glass or carbon fibers. In some aspects matrix 34b may be surrounded about its periphery by a reinforcing material such as a ring of ceramic or other non-magnetic material with a strength and/or resistance to creep greater than that of matrix 34b or by windings of glass or carbon fibers.

Figure 8A:
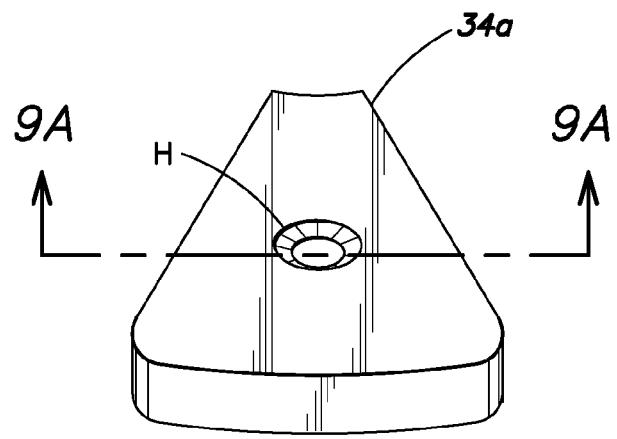
FIG. 8A is a perspective view of an embodiment of a pole element shown in FIG. 7.
Figure 9A:
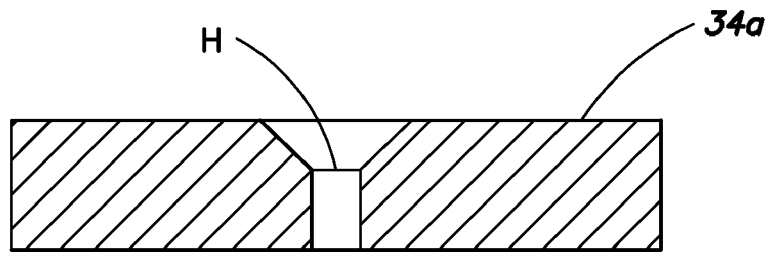
FIG. 9A is a sectional view along line 9A-9A of the pole element of FIG. 8A.

In some aspects, drive plate 34 may be formed in a molding operation in which pole elements 34a are placed in a mold into which a liquid epoxy or similar material is then introduced and allowed to cure to form matrix 34b. It has been discovered that the design of the shape of pole pieces 34a may facilitate the retention of pole pieces 34a in matrix 34b, and in some cases may reduce the need for an over-molding, which in some embodiments may have been utilized to facilitate the retention of pole pieces 34a in matrix 34b. For example, one or more holes H may be provided in pole elements 34a in order to facilitate securing pole elements 34a in matrix 34b of drive plate 34. Holes H may be through holes which pass completely through pole elements 34a. A portion of matrix 34b may fill all or a portion of one or more of holes H to securely retain one or more of pole pieces 34a in matrix 34b. FIG. 8A illustrates a pole element 34a with a hole H which is formed with a first section with a conical cross-sectional profile and with a second section with relatively straight sidewalls. The vertical cross-sectional profile of hole H is illustrated in FIG. 9A, which is a cross section through FIG. 8A along line 9A-9A. Hole H may in some aspects have a generally cylindrical horizontal cross section, or in other aspects, a horizontal cross section of an alternate shape.

Figure 8B:
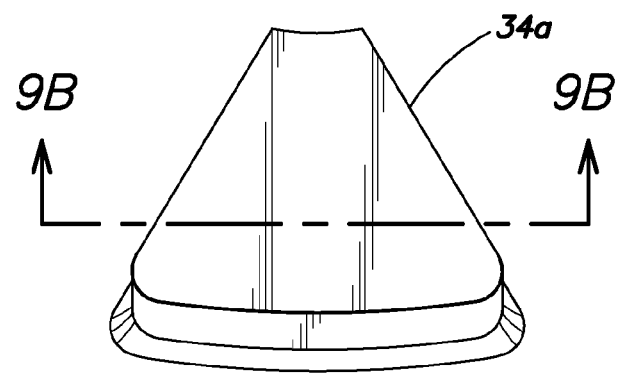
FIG. 8B is a perspective view of a second embodiment of a pole element shown in FIG. 7.
Figure 8C:
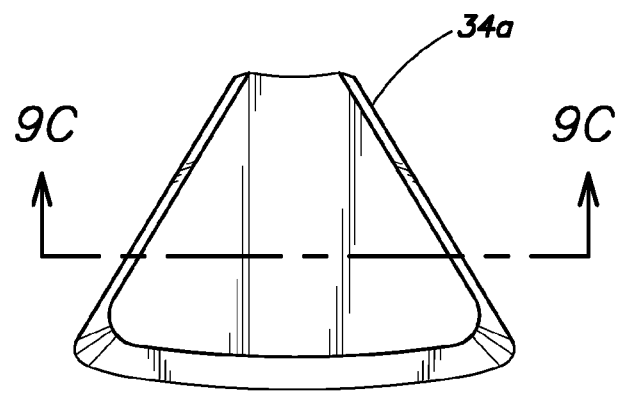
FIG. 8C is a perspective view of a third embodiment of a pole element shown in FIG. 7.
Figure 9B:
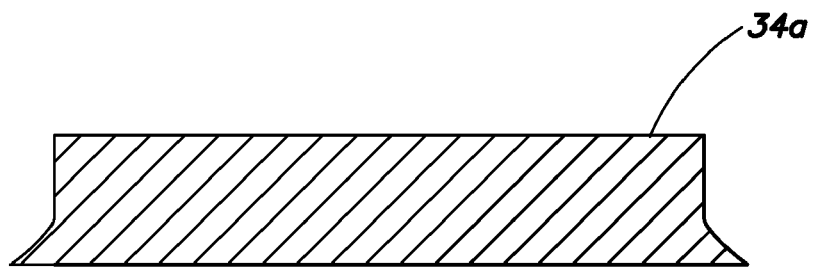
FIG. 9B is a sectional view along line 9B-9B of the pole element of FIG. 8B.
Figure 9C:
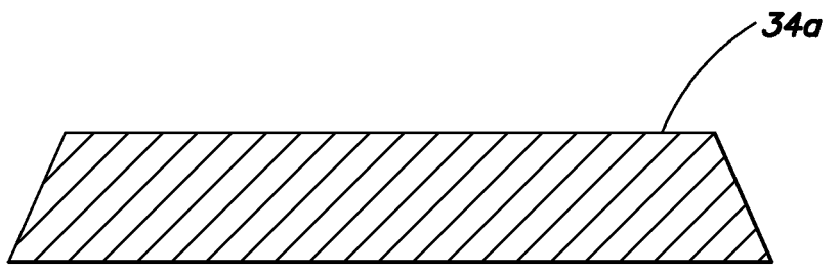
FIG. 9C is a sectional view along line 9C-9C of the pole element of FIG. 8C.

It has also been discovered that forming pole elements 34a in alternate shapes, such as those illustrated in FIGS. 8B and 8C and in cross-section in FIGS. 9B and 9C, which have beveled or non-parallel sidewalls, or beveled or non-parallel portions of sidewalls, may also facilitate the retention of pole pieces 34a in matrix 34b. This allows for a drive plate 34 to be constructed which is light weight and does not suffer from drawbacks such as poor balance, poor mechanical stability, or poor aerodynamics which may have made previous designs of drive plates including separate pole pieces unfeasible.

In other aspects, pole elements 34a may be press fit into a preformed matrix 34b or may be secured to matrix 34b with an adhesive, or with one or more fasteners, such as screws, bolts, rivets, or tabs and grooves.

Central boss 91 of drive plate 34 that surrounds the shaft 78 may be molded continuously with matrix 34b. In some aspects, central boss 91 may include a metallic central bore (not shown) that may be press fit or otherwise secured to matrix 34b. Shaft 78 may be molded, press fit, or otherwise secured to central boss 91 or to a metallic central bore included therein.

It has been discovered that by integrally molding shaft 78 into drive plate 34, an improvement in overall stability, balance, and weight of drive plate 34 may be achieved, resulting in a decrease in the potential for undesirable vibration or mechanical failure of drive plate 34 in use. Integrally molding shaft 78 into drive plate 34 may also result in a reduction in cost in the production of the magnetic drive assembly 26.

The attractive magnetic force acting on the drive plate 34 may be carried at a single, central pivot point formed by a hemispherical ball-bearing projecting from the bottom surface of the drive assembly and a plate 96, formed of, for example, stainless steel, and mounted flush with the upper surface of the cup base wall 22b. This arrangement resists the magnet forces pulling down on the plate 34 while at the same time facilitating a low-friction, low-wear rotation of the shaft 78.

Figure 10:
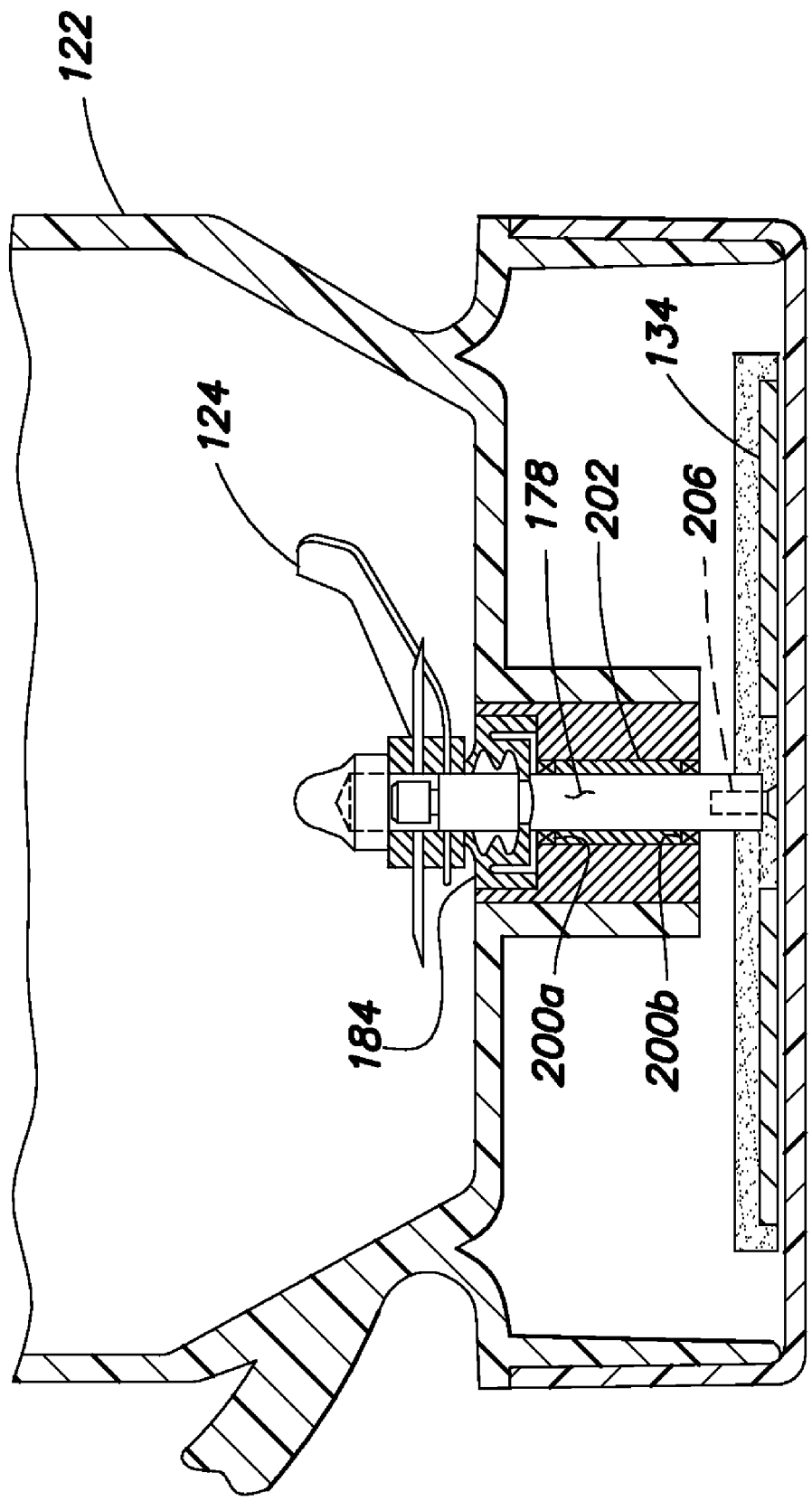
FIG. 10 is a vertical sectional view of an alternative embodiment of the blender cup of the present invention.

With reference to FIG. 10, in an alternative embodiment of the blender cup 122, the shaft 178 is rotatably supported by two axially spaced needle bearings 200a and 200b. A cylindrical spacer 202 is interposed between the needle bearings 200a and 200b and surrounds the shaft 178. The drive plate 134 is attached to the shaft 178 through a screw 206 having external threads for mating with complementary internal threads formed in the shaft 178. This particular arrangement allows the shaft 178 to be rotatably supported by the needle bearings 200a and 200b and the screw 206 without the need for the hemispherical ball-bearing projecting from the bottom surface of the drive assembly and the stainless steel plate 96 mounted within the cup base wall. It should be understood that the component parts of the embodiment of FIG. 10 are similar to those previously described herein, and accordingly the same reference numerals are used to designate similar parts although the numerals are incrementally increased by 100 to differentiate the embodiments described herein.

The desired level of traction depends on each application. It is selected to reliably couple the drive plate to the drive magnet when (i) the impellers 24 are started under the load of the shaved ice and liquid ingredients of a frozen drink in the blender cup, (ii) during a ramp up of the operating speed to a selected operating speed, typically thousands of rpm, and then (iii) as the impeller, and the slushy mass in the cup and interacting with the impeller, is brought to a stop. However, the traction is also selected to disconnect, and thereby automatically clutch, the drive 26 when the cup 22 is removed from its operating position on the base wall 50a under the ice chute 18, or when the load exceeds a preset maximum value. This latter situation can arise, for example, when the frozen drink "freezes up" in the cup, that is, becomes partially or totally a solid frozen mass, or when an object inadvertently falls into the blender as it is operating, e.g., a spoon, jewelry, or bottle cap. By de-coupling, the magnetic drive 26 automatically and immediately cuts off power to the impellers to avoid or minimize injury to person(s) near the blender and to the machine itself. This feature also avoids the cost of providing and maintaining a mechanical clutch.

It is significant to note that the drive plate assembly 34, in some aspects including pole elements 34a, matrix 34b, and a plastic over molding, is light and non-magnetic. There is little detectable gyroscopic effect when the cup is removed from the blender/shaver after use. There is a low rotational momentum due to the impellers and drive plate assembly. The cup is easy to handle because it is light-weight and nonmagnetic.

The magnetic drive 26 of the present invention allows the cup 22 to be placed in an operating position on the blender/shaver 10 with a simple, lateral sliding movement of the smooth, flat cup base 22b over the smooth, flat base portion 50a. There is no need to drop the cup vertically onto a mechanically interlocking drive coupling, and then vertically lift the cup off this coupling. The lateral sliding insertion and removal movements are not only more convenient, but they also reduce the vertical clearance required above the cup. This slide-in arrangement also facilitates cleaning the blender base-one need only wipe a smooth surface. Spilled liquid and slush can flow or be pushed over the surface to a drain 94 formed in the base at the rear of the wall 50a. In the event of a safety hazard, blender overload, or any unusual situation requiring a rapid removal of the cup, it is simply and rapidly withdrawn from the machine with a sliding motion. Further, if an operator is impatient and removes the cup before the motor has fully stopped, a common problem in actual use in a bar, the process of removal itself automatically disconnects the impeller drive from the motor 28 (a misalignment and/or lifting of the cup moves the pole elements 34a out of a coupled relationship with the magnetic lines of force produced by the magnet assembly 38). In conventional belt driven, mechanically-clutched blender/shavers, such a premature removal causes stress and wear on the drive train and the clutch.

Figure 18:
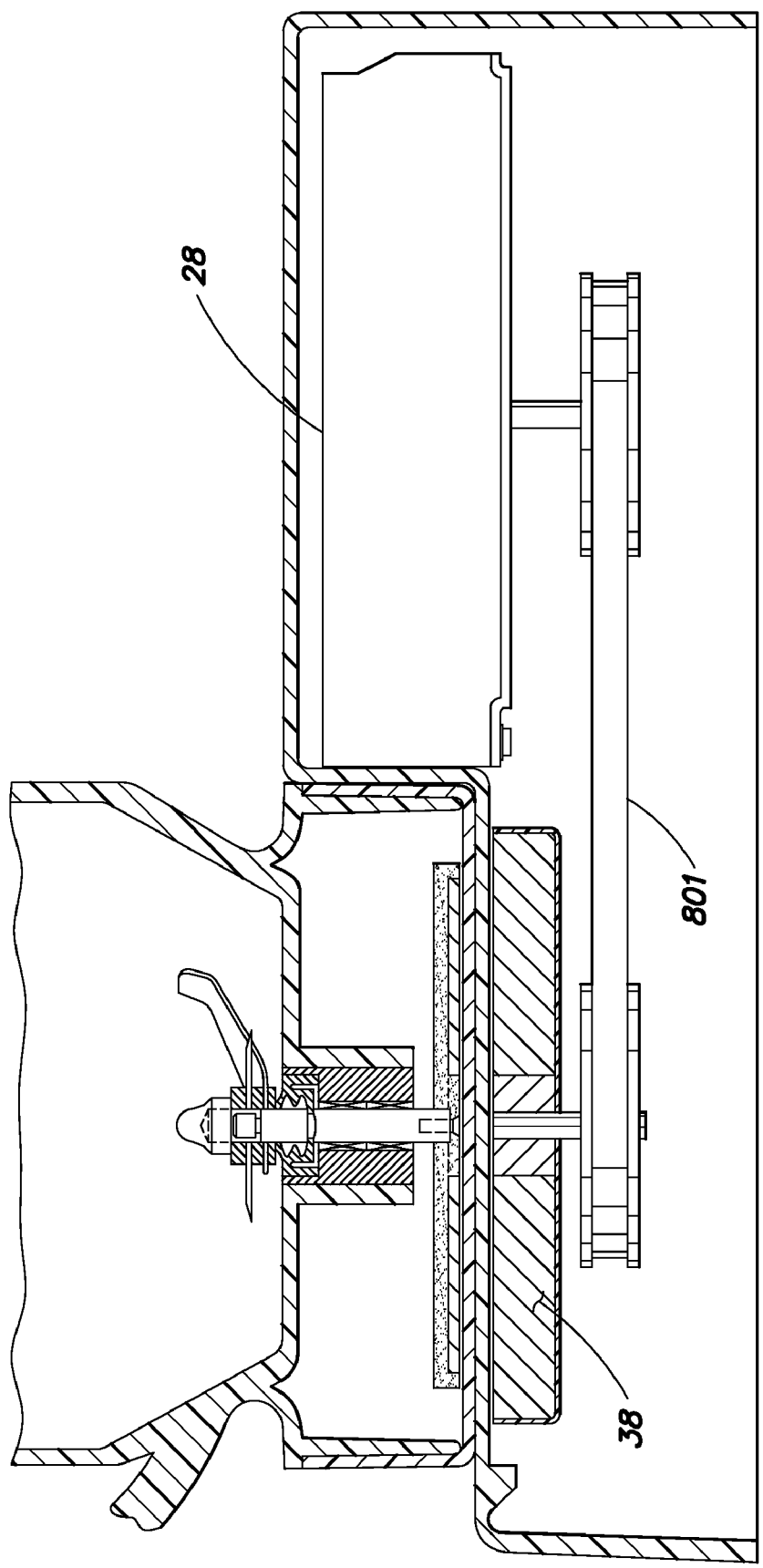
FIG. 18 is a vertical sectional view of a base of an embodiment of a blender/shaver machine according to the present invention illustrating an alternate motor mounting position.
Figure 19:
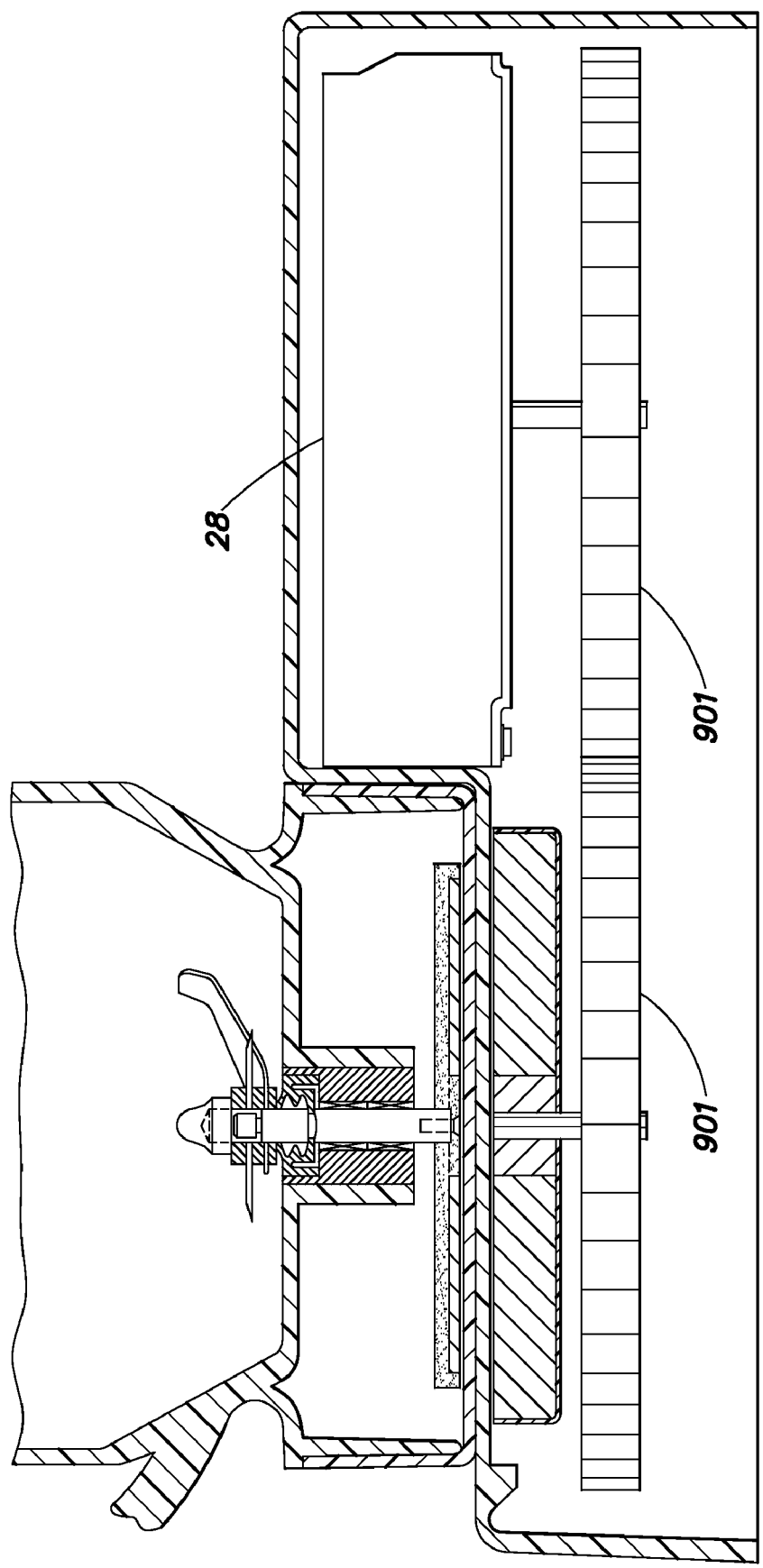
FIG. 19 is a vertical sectional view of a base of a further embodiment of a blender/shaver machine according to the present invention illustrating an alternate motor mounting position.

A further advantage of some embodiments of this drive is that the motor may be located directly under the blender, thus eliminating drive belts or chains and pulleys or sprockets, but does so while still maintaining vertical, as well as horizontal compactness, both in terms of the height of the motor itself, the vertical height of the coupling between the motor and the cup, and the vertical clearance needed to maneuver the cup onto and off the coupling. However, alternate embodiments, such as those illustrated in FIGS. 18 and 19 are also feasible and include a motor not located directly beneath the rotor magnet assembly and drive disk, but rather offset and mechanically coupled to the rotor magnet assembly by means of a belt 801 (FIG. 18) or by coupled gears 901 (FIG. 19). The arrangements illustrated in FIGS. 18 and 19 may allow for a lower overall height of a base of a blender 10 than an arrangement wherein the motor is located directly below the blender drive plate.

While this invention has been described with respect to some illustrative embodiments, it will be understood that various additional modifications and variations will occur to those skilled in the art. For example, while a rotating magnet assembly has been described as the member coupling to the plate in the cup base, it is possible to produce a rotating electromagnetic or magnetic field using an assembly of electromagnets or other permanent magnet arrangements such as a single, one-piece permanent magnet magnetically configured, or acting in combination with ferromagnetic materials, to produce the desired array of magnetic poles. While the invention has been described with reference to a plate rotatable in the base of a blender cup, the driven element could assume a wide variety of other forms, and need not even be a liquid-holding vessel. While the magnets and plate have been described as having the same number of poles, this is not essential to the operating of this invention. A variety of mounting and rotational support arrangements are possible for both the magnet assembly 38 and the drive plate 34. Further, while individual plate-like elements have been described as forming the pole elements 34a and controlling eddy currents in the plate, one skilled in the art will readily see that a variety of other known arrangements for forming poles and controlling eddy currents are possible.

Figure 11:
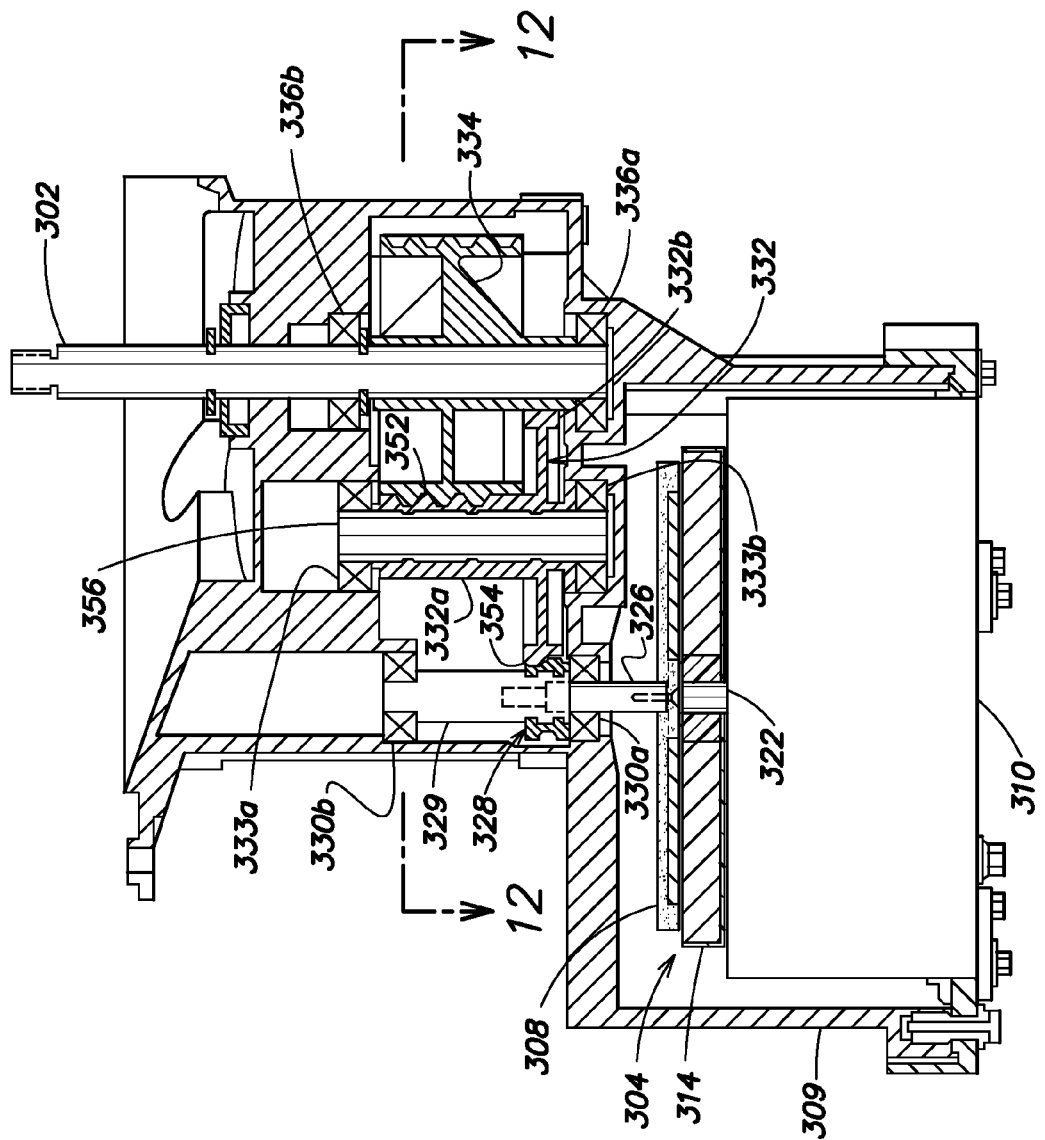
FIG. 11 is a vertical sectional view of the magnetic drive and gear assembly for the ice shaver portion of the blender/shaver of an embodiment of the present invention.
Figure 12:
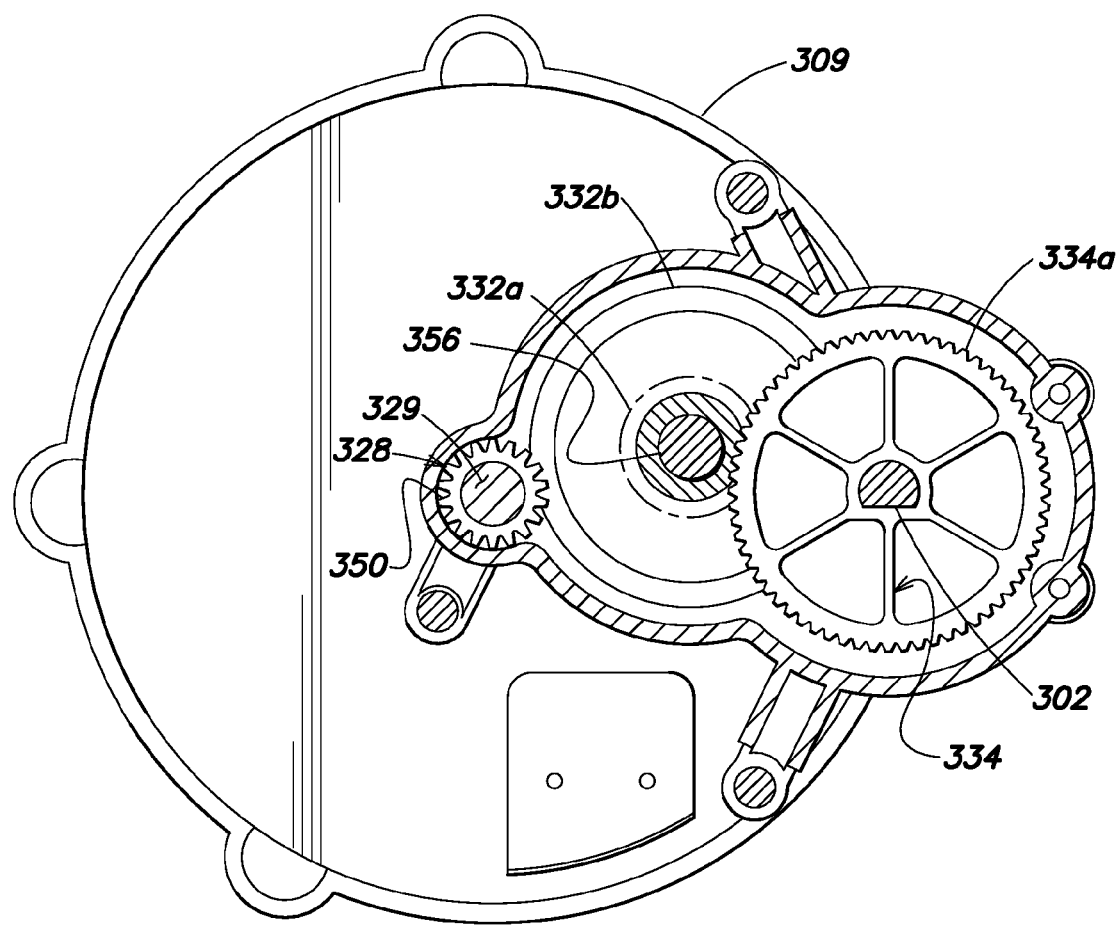
FIG. 12 is a vertical cross-sectional view along line 12-12 of FIG. 11 of the magnetic drive and gear assembly of FIG. 11.

FIGS. 2, 11, and 12 illustrate a further application of the present invention, namely, in an ice shaver assembly for supplying shaved ice to the blender of the blender/shaver machine 10. The ice shaver assembly includes a magnetic drive and gear assembly 300 that operates to rotate blades 14 to supply shaved ice to the blender cup 22 through chute 16. The magnetic drive and gear assembly 300 is coupled to an output shaft 302 that is connected at its upper end to the rotating set of blades 14. The magnetic drive and gear assembly 300 includes a magnetic drive 304 that is analogous in structure and operation to the magnetic drive 26 of the blender. The output of the magnetic drive is transmitted through a gear assembly 306 to the output shaft 302 of the shaver. The gear assembly includes three gears, namely, a motor gear 328, a compound idler gear 332, and an output gear 334.

The magnetic drive 304 for the shaver includes a generally circular drive plate 308 rotatably mounted in the motor housing 309 of the ice shaver assembly and a motor 310 including a rotor 314.

The motor 310 is mounted in the motor housing 309 beneath the rotor 314. The motor 310 is constructed and operates in a manner analogous to the motor 28 of the magnetic drive 26 of the blender described above. In one or more aspects, the motor includes a stator energized by a motor drive circuit to produce a rotating electromagnetic field. The rotor 314 with the shaft 322 secured at its center may slide axially into a bearing in the motor. The rotor 314 may rotate in the bearing with clearance on all sides of the rotor 314.

As in the case of the rotor 32 of the magnetic drive 26 of the blender, described above, the position of the motor 314 can be sensed by three conventional Hall effect sensors mounted in the motor housing 309. Position signals provide input to an electronic control and drive circuit that energizes the motor 310 to produce a startup torque, a ramp up of the rotor speed of rotation to a selected operating speed, a maintained rotation at that selected speed under load, and a rapid and reliable braking torque. As in the case of the motor 28 described above, operation of the motor 310 thus can be electronic and programmable. Braking is electronic—with braking currents in some aspects induced in windings of motor 310 (in aspects where motor 310 comprises windings) being dissipated in large resistors or FETs mounted on heat sinks.

The drive plate 308 can be structured in a manner analogous to the drive plate 34 of the magnetic drive 26 of the blender described above. The drive plate 308 is non-rotatably secured to the lower end of a drive shaft 326. The motor gear 328 is non-rotatably attached to a motor gear shaft 329 which in turn is attached to the upper end of the drive shaft 326. The motor gear 328 is preferably a helical gear having a plurality of helical gear teeth 350. The drive shaft 326 axially fits within the gear shaft 329 and is non-rotatably secured to the gear shaft 329 and the gear 328 to permit the drive shaft 326 and the gear 328 to rotate in unison. Thus, rotational torque from the drive plate 308 can be transmitted to the gear 328 through the drive shaft 326. The drive shaft 326 and the gear shaft 329 of the motor gear 328 are rotatably supported by a pair of journal bearings 330a and 330b.

The compound idler gear 332 is mechanically coupled to the motor gear 328 and the output gear 334 to transmit rotational torque from the motor gear 328 to the output gear 334. The idler gear 332 includes an elongated, cylindrically-shaped upper gear portion 332a having a plurality of helical gear teeth 352 and a generally disk-shaped lower gear portion 332b. The lower gear portion 332b is provided with a plurality of helical gear teeth 354 complementary in size and shape to the gear teeth 350 of the motor gear 328. The gear teeth 350 of the motor gear 328 engage the gear teeth 354 of the lower gear portion 332b to transmit rotational motion and torque from the motor gear 328 to the idler gear 332. The compound idler gear 332 is non-rotatably secured to a gear shaft 356 which is rotatably supported by a pair of journal bearings 333a and 333b.

The output gear 334 is generally cylindrical in shape and is non-rotatably attached to the output shaft 302 to rotate with the output shaft 302. In particular, the output gear 334 is axially disposed over the output shaft 302 such that the output shaft is fitted within the central opening of the output gear 334. The output gear 334 is provided with a plurality of helical gear teeth 334a complementary in size and shape to the gear teeth 352 of the upper gear portion 332a of the idler gear 332. The gear teeth 352 of the upper gear portion 332a engage the gear teeth 334a of the output gear 334 to transmit rotational motion and torque from the idler gear 332 to the output gear 334. The output shaft 302 and the output gear 334 are rotatably supported by a pair of journal bearings 336a and 336b.

The rotor gear 328, the idler gear 332, and the output gear 334 may be helical gears, having helically oriented gear teeth, constructed of light weight, high strength plastic material, such as an acetal such as polyoxymethane, polycarbonate, or nylon. One skilled in the art will recognize, however, that other gear types, such as spur gears, worm gears, or combinations thereof, and other materials, such as metals or composites, can be used in the gear assembly 306 of the present invention.

The gear ratio of the gear assembly 306 of the present invention can be adjusted to increase or to decrease the rotational speed and torque transmitted from the drive shaft 326 of the magnetic drive 304 to the output shaft 302 of the ice shaver. For example, the gear ratio of the gear assembly 306 can be adjusted to reduce the rotational speed, and thus increase the torque, transmitted from the drive shaft 326 to the output shaft 302. Conversely, the rotational speed transmitted by the gear assembly 306 can be increased, thereby reducing the torque transmitted, by adjusting the gear ratio of the gear assembly 306. The gear ratio can be adjusted by changing the number of gear teeth, the number of gears, and/or the size of gears of the gear assembly, as known in the art.

In an embodiment of the ice shaver of the present invention, the desired speed of the output shaft 326 of the ice shaver may be approximately 540 rpm for effective operation of the ice shaver. The magnetic drive 300 of the present invention may generate an operational speed of approximately 6000 rpm. Accordingly, the gear ratio of the gear assembly 306 may be approximately 11.1:1.

One skilled in the art will readily appreciate that the magnetic drive and gear assembly of the present invention can be used in a wide variety of applications, in addition to the ice shaver described above, where it is desired to transmit power from a rotary output of a motor to a driven member under a load, including in other food processing equipment such as blenders, food mixers, food processors, and juicers.

Additionally, although the ice shaver of the present invention is described as a component of a combination blender/ice shaver machine, one skilled in the art will readily appreciate that the ice shaver can be a stand alone unit, i.e., the ice shaver can be independent of the blender.

Moreover, one skilled in the art will appreciate that the type and number of gears, the size of the gears, and the number of gear teeth of the gear assembly described herein in connection with the ice shaver of the present invention is exemplary only. These features, as well as other features of the gear assembly, can be varied to achieve the same, similar or, different gear ratios, as is desired for a specific application, without departing from the scope of the present invention. For example, design considerations, such as weight and size limitations, can dictate the number, type, and size of gears, as well as the number of gear teeth, employed to achieve the desired gear ratio.

These and other modifications and variations which will occur to those skilled in the art having read the foregoing specification in light of the accompanying drawings are intended to fall within the scope of the appended claims.

FIG. 13 is an exploded view in vertical section of an embodiment of the motor of the present invention. As shown in FIG. 13, the motor 400 may include a motor shaft 410, a rotor 420 mounted on the motor shaft 410, and a stator 430 disposed about the motor shaft 410. The rotor 420 may include a drive magnet 38B, a hub 450, and a rotor magnet 460. The stator 430 may include at least one stator coil 30 and a stator housing 480.

In one aspect, the stator 430 may include at least one Hall effect sensor for determining the position of the rotor 420 according to schemes previously described herein.

As shown in FIG. 13, the drive magnet 38B and the rotor magnet 460 may comprise a first annular magnet and a second annular magnet, respectively. Alternately, the drive magnet 38B and/or the rotor magnet 460 may include multiple separate magnets disposed about the motor shaft 410. The multiple separate magnets may comprise arcuate-shaped magnets. In some aspects, two or more of the magnets may be attached to each other by using an adhesive. The adhesive may include a glue, a conventional potting compound, or another type of adhesive. In some aspects, the drive magnet 38B and/or the rotor magnet 460 may include a magnet at least partially constructed from a rare-earth-type material. For example, the drive magnet 38B and/or the rotor magnet 460 may include a magnet constructed at least partially from neodymium. Potentially advantageously, using magnets constructed from rare-earth materials may reduce a weight of the motor 400, which can lead to a reduction in heat, noise, and/or vibration during operation of the motor 400. The drive magnet 38B and/or the rotor magnet 460 may be substantially centered and/or substantially symmetric about the motor shaft 410.

Generally, the hub 450 may include a hub upper surface 452 facing away from the stator 430 and a hub lower surface 454 facing toward the stator 430. The hub 450 may be substantially centered and/or substantially symmetric about the motor shaft 410. The drive magnet 38B may be coupled to the hub upper surface 452, and the rotor magnet 460 may be coupled to the hub lower surface 454. The hub upper surface 452 may include a recess 456 for receiving the drive magnet 38B. The recess 456 may be designed so that the hub upper surface 452 substantially encloses the drive magnet 38B. Alternately, the recess 456 may be designed so that a portion of the drive magnet 38B extends upward from the hub upper surface 452. The hub lower surface 454 may include a sidewall 458 extending downward from the hub lower surface 454, and the rotor magnet 460 may be coupled to the sidewall 458. The sidewall 458 may include an inner surface 459 facing toward the motor shaft 410, and the rotor magnet 460 may be coupled to the inner surface 459.

A variety of different configurations of the rotor 420 are possible. For example, the hub upper surface 452 and/or the hub lower surface 454 may be substantially planar. Also, the hub upper surface 452 may include a sidewall extending upward from the hub upper surface, and the drive magnet 38B may be coupled to the sidewall in a manner similar to that previously described with respect to the rotor magnet 460. Additionally, the hub lower surface 454 may include a recess for receiving the rotor magnet 460 in a manner similar to that previously described with respect to the drive magnet 38B.

The hub 450 may be formed at least in part from a metal or a magnetizable material. Alternately, the hub 450 may be formed at least in part from a plastic material.

The drive magnet 38B and the rotor magnet 460 may have multiple circumferentially arrayed poles. The drive magnet 38B and the rotor magnet 460 may be disposed so that their poles are aligned.

The drive magnet 38B and the rotor magnet 460 may be coupled to the hub 450 so that the drive magnet 38B, the rotor magnet 460, and the hub 450 rotate together about the motor shaft 410. The drive magnet 38B and the rotor magnet 460 may be coupled to the hub 450 by using a variety of conventional schemes. For example, the drive magnet 38B and/or the rotor magnet 460 may be removably and replaceably attached to the hub 450 by using removable and replaceable fasteners, such as clips, dowels, nails, nuts and bolts, screws, spikes, rivets, tacks, and/or other conventional mechanical fasteners. Alternately, the drive magnet 38B and/or the rotor magnet 460 may be press fit to the hub 450. Also alternately, the drive magnet 38B and/or the rotor magnet 460 may be attached to the hub 450 by using an adhesive, a braze, and/or a weld.

FIG. 14 is a view in vertical section of the embodiment of the motor shown in FIG. 13, illustrating an assembled motor. The drive magnet 38B may be secured at a drive magnet lower surface 442 to an upper inner surface of recess 456. Optionally, as shown in FIG. 14, the drive magnet 38B may also be secured at a drive magnet upper surface 444 to the hub upper surface 452. As previously described, the hub upper surface 452 may include a recess 456, and the recess 456 may substantially enclose the drive magnet 38B. The recess 456 may be designed so that a first gap 446 occurs between the upward extent of the hub upper surface 452 and the upward extent of the attached drive magnet 38B. The first gap 446 may be filled with an adhesive to further attach the drive magnet 38B to the hub 450 and provide a substantially planar upper rotor surface 422. In one embodiment, the first gap 446 may be filled with a conventional potting compound. The potting compound may be cured. After curing, excess potting compound may be removed to provide a substantially planar upper rotor surface 422. Potting compound may also be applied to fill in a second gap 448 between a transverse extent of the attached drive magnet 38B and a transverse extent of the recess 456. A similar scheme may be utilized to generate a substantially planar upper rotor surface 422 in embodiments in which a portion of the attached drive magnet 38B extends upward beyond the hub upper surface 452. For example, potting compound may be applied to the hub upper surface 452 to surround the portion of the drive magnet 38B extending upward from the hub upper surface 452.

As shown in FIG. 13, the stator 430 may include a conventional stator 430 having at least one stator coil 30. The stator coil 30 may be disposed on the stator housing 480, and the stator housing 480 may include a bore 482 for receiving the motor shaft 410. The stator 430 and, in particular, the at least one stator coil 30 may be substantially centered about the motor shaft 410. Generally, the stator 430 may be assembled by using schemes similar to those previously described with respect to FIGS. 3, 4, and 10-12 and accompanying description.

As shown in FIG. 14, the motor shaft 410 may be journalled in the bore 482 of the stator housing 480 and the rotor 420 may be rotatably mounted on the motor shaft 410 by using schemes similar to those previously described. The at least one stator coil 30 may include an outer stator surface 472 facing away from the motor shaft 410, and the rotor magnet 460 may include an inner rotor magnet surface 462 facing toward the motor shaft 410. Generally, the motor 400 may be assembled so that the inner rotor magnet surface 462 at least partially faces the outer stator surface 472. The configuration of the motor 400 provides an alternative to the configurations of the motors 28 and 310 shown in FIGS. 4 and 11, respectively.

As previously indicated, in one embodiment, the rotor magnet 460 may include multiple rotor magnets disposed about the motor shaft 410. In such an embodiment, at least one of the multiple rotor magnets 460 may include an inner rotor magnet surface 462 that at least partially faces the outer stator surface 472.

A variety of different configurations of the motor 400 are possible. For example, the rotor magnet 460 may be disposed within the at least one stator coil 30. In such an embodiment, the rotor magnet 460 may include an outer rotor magnet surface facing away from the motor shaft 410, and the at least one stator coil 30 may include an inner stator surface facing toward the motor shaft 410. The motor 400 may then be assembled so that the inner stator surface at least partially faces the outer rotor magnet surface.

FIG. 15 is an exploded view in vertical section of the motor shown in FIG. 13, illustrating a motor base. The motor 400 may be coupled to the motor base 500 by using conventional mechanical fasteners, e.g. screws 510, 520. Generally, the motor 400 may be coupled to the food processing apparatuses and magnetic drives previously described. For example, the motor 400 may generate a torque for transmission to a drive plate in a food processing apparatus. In such an embodiment, the drive magnet 38B may be magnetically coupled to the drive plate, and the stator 430 may be energized to produce an electromagnetic field that interacts with the rotor magnet 460 to rotate the rotor magnet 460. The drive magnet 38B may rotate with the rotor magnet 460 and may induce a magnetic field in a direction toward the drive plate to transmit torque from the motor 400 to the drive plate.

Figure 16A:
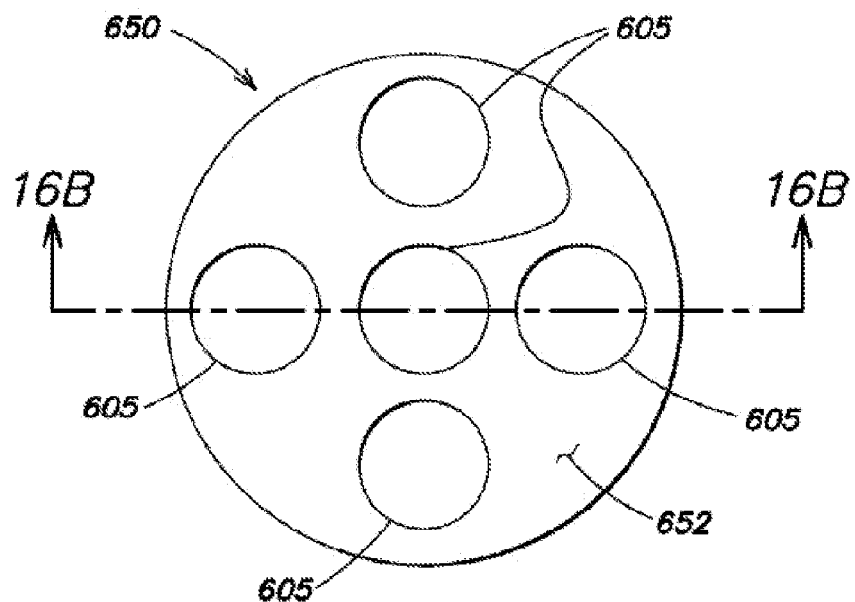
FIG. 16A is a top view of an alternative embodiment of the hub shown in FIGS. 13-15.
Figure 16B:
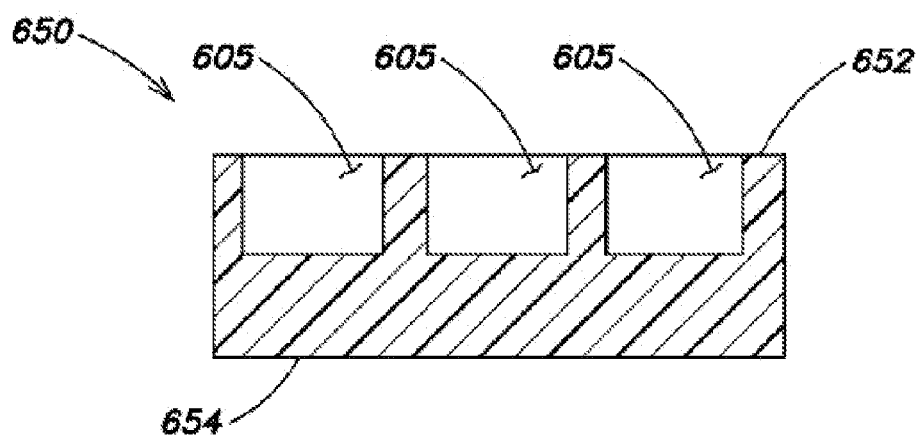
FIG. 16B is a view in vertical cross-section along line 16B-16B of FIG. 16A of the hub shown in FIG. 16A.

FIGS. 16A and 16B are views of an alternative embodiment of the hub of the motor 400 shown in FIGS. 13-15. As shown in FIGS. 16A and 16B, in one embodiment, the hub 650 may include multiple channels 605 extending downward from a hub upper surface 652 towards a hub lower surface 654. The channels 605 may be formed in the hub upper surface 652 according to conventional schemes. For example, the channels 605 may be drilled in the hub upper surface 652. The channels 605 may have a variety of different shapes and may be disposed at a variety of locations on the hub upper surface 652. In one embodiment, the drive magnet 38B may include multiple separate magnets sized and shaped to be disposed in the channels 605. The multiple separate magnets may be disposed in the channels according to previously described schemes. As previously indicated, the multiple magnets may be at least partially constructed from a rare-earth material. Potentially advantageously, such an embodiment may reduce a weight of the motor 400, which can lead to a reduction in heat, noise, and/or vibration during operation of the motor 400.

Figure 17:
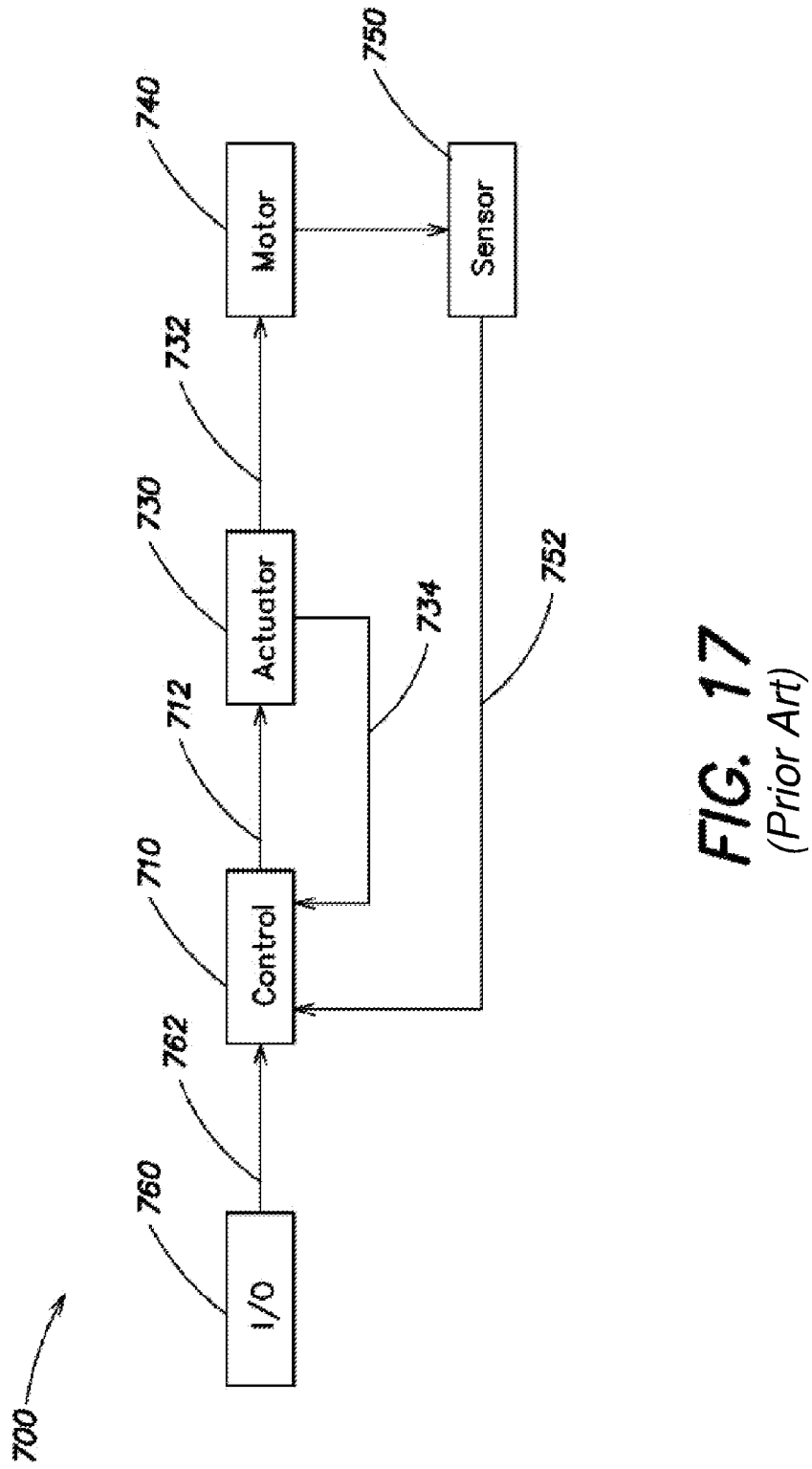
FIG. 17 is a diagram of an embodiment of a system for controlling a motor of the present invention.

FIG. 17 is a diagram of an embodiment of a system for controlling a motor of the present invention. As shown in FIG. 17, the system 700 may include a control unit 710, an actuator 730, a motor 740, a sensor 750, and an input/output device 760. Generally, control unit 710 may control a current and/or a voltage provided to motor 740 based on an input signal 762 from input/output device 760 and/or a signal 752 from sensor 750.

As shown in FIG. 17, motor 740 may be connected to a sensor 750 that can measure a back electromotive force (back EMF) generated by motor 740. The sensor 750 and/or the control unit 710 may determine a speed and/or a position of the rotor of the motor 740 based on the measured back EMF. As will be understood by those of ordinary skill in the art, a speed of the rotor may be determined based on a magnitude of the back EMF, and a position of the rotor may be based on a location of zero-crossing(s) of the back EMF. The sensor 750 may provide a signal 752 including the measured back EMF and/or other data, such as a position and/or a speed of the rotor, to control unit 710.

As shown in FIG. 17, control unit 710 may receive a signal 762 from an input/output device 760. Input/output device 760 may include an interface for interacting with a user. In one embodiment, input/output device 760 may communicate operating parameter(s) of the motor 740 between control unit 710 and a user. For example, input/output device 760 may communicate a user-desired operating speed of the motor 740 to control unit 710. Also, input/output device 760 may communicate an actual operating speed of motor 740 to a user.

As shown in FIG. 17, control unit 710 may provide a control signal 712 to an actuator 730. Actuator 730 may generate an actuating or driving signal 732 for motor 740 based on the control signal 712 from control unit 710. In one embodiment, actuator 730 may include an amplifier. For example, actuator 730 may include an inverting operational amplifier.

As shown in FIG. 17, actuator 730 may provide a feedback signal 734 to control unit 710. In one embodiment, feedback signal 734 may be based on a current provided to motor 740, and control unit 710 may monitor feedback signal 734. Control unit 710 may adjust the current provided to motor 740 based on feedback signal 734, i.e. based on the current provided to motor 740. In one embodiment, control unit 710 may be designed to adjust the current provided to the motor 740 based on feedback signal 734 exceeding a pre-determined value. For example, control unit 710 may be designed to reduce the current provided to motor 740 based on the feedback signal 734 exceeding a pre-determined value associated with safe operation of motor 740.

Control unit 710 may include at least one application-specific processor (ASP) familiar to those of ordinary skill in the art. In one embodiment, control unit 710 may include a digital signal processor (DSP), and the DSP may include at least one analog-to-digital converter (ADC) and/or other operating component(s) familiar to those of ordinary skill in the art.

An exemplary operation of control system 700 may be understood in the following manner. Based on data 762 received from input/output device 760, control unit 710 may determine an operating parameter for motor 740. For example, control unit 710 may determine an operating speed of a rotor of the motor 740. Control unit 710 may provide a corresponding control signal 712 to actuator 730, and, based on the control signal 712, actuator 730 may provide an actuating signal 732 to motor 740 sufficient to actuate motor 740 to the desired operating parameter. Control unit 710 may monitor the operating parameter measured by sensor 750, and may adjust the control signal 712 provided to actuator 730 based on a difference between a desired operating parameter and the measured operating parameter. Control unit 710 may also monitor the feedback signal 734 provided by actuator 730.

Generally, control system 700 may control a current provided to motor 740 and/or to a component associated with motor 740, such as a component previously described herein, for example, a blender, a food processor, and an ice shaver. For example, control system 700 may control a current provided to a blender and/or an ice shaver connected to the blender. Control system 700 may control a speed of the motor 740 and/or a speed of a component associated with the motor 400. Control system 700 may be designed to control motors similar to those previously described herein, including brushless motors and 3-phase brushless motors.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A food processing apparatus having a rotary element to be driven by a rotating magnetic field, the food processing apparatus comprising:
    a food-contact chamber defined by an exterior wall;
    a driven member disposed within the food-contact chamber, the driven member including a plurality of discrete bodies of magnetically soft material supported from a rotating shaft arranged to rotate responsive to the rotating magnetic field; and
    a driving element configured to generate the rotating magnetic field, the driving element disposed outside the food-contact chamber and positioned, in use of the food processing apparatus, beneath the driven member.

2. The food processing apparatus of claim 1, wherein the driving element includes a rotor disposed in a base of the food processing apparatus.

3. The food processing apparatus of claim 1, wherein the driven member further comprises a reinforced matrix at least partially surrounding the discrete bodies.

4. The food processing apparatus of claim 1, wherein the discrete bodies comprise a plurality of materials.

5. The food processing apparatus of claim 1, wherein the driving element comprises a plurality of electromagnets.

6. The food processing apparatus of claim 5, wherein at least a first of the plurality of electromagnets at least partially vertically overlaps at least a second of the plurality of electromagnets.

7. The food processing apparatus of claim 1, further comprising a housing containing the driving element, the driving element having no moving parts.

8. The food processing apparatus of claim 1, wherein the driving element includes a plurality of permanent magnet poles carried on a rotating shaft.

9. The food processing apparatus of claim 1, wherein the discrete bodies comprise a ferromagnetic material.

10. The food processing apparatus of claim 1, wherein the discrete bodies comprise a laminated structure.

11. The food processing apparatus of claim 1, wherein the discrete bodies are embedded in a non-magnetic matrix.

12. The food processing apparatus of claim 1, wherein the discrete bodies are retained in a matrix, and this retention is facilitated by the inclusion of at least one of at least partially non-parallel sidewalls on the discrete bodies and one or more holes in the discrete bodies.

13. The food processing apparatus of claim 1, wherein each of the discrete bodies comprises a first vertical sidewall and a second vertical sidewall, each of the first vertical sidewall and the second vertical sidewall having a region acutely angled from a line normal to one of an upper and a lower surface of the each of the discrete bodies.

14. The food processing apparatus of claim 12, wherein the discrete bodies comprise one or more through holes, at least a portion of the one or more through holes being filled with the matrix.

15. The food processing apparatus of claim 1, wherein the driven member is at least partially enclosed in an over-molding.

16. A food processing apparatus having a rotary element to be driven by a rotating magnetic field, the food processing apparatus comprising:
    a food-contact chamber defined by an exterior wall; and
    a driven member disposed within the food-contact chamber, the driven member including a plurality of generally pie-shaped discrete bodies of magnetically soft material supported from a rotating shaft arranged to rotate responsive to the rotating magnetic field.

17. The food processing apparatus of claim 16, wherein the discrete bodies comprise a laminated structure.

18. The food processing apparatus of claim 16, wherein the discrete bodies are embedded in a non-magnetic matrix.

19. The food processing apparatus of claim 18, wherein the discrete bodies are retained in the non-magnetic matrix, and this retention is facilitated by the inclusion of at least one of at least partially non-parallel sidewalls on the discrete bodies and one or more holes in the discrete bodies.

20. The food processing apparatus of claim 16, wherein the driven member further comprises a reinforced matrix at least partially surrounding the discrete bodies.

* * * * *